(12) United States Patent
Le Leannec et al.

(10) Patent No.: US 7,912,985 B2
(45) Date of Patent: Mar. 22, 2011

(54) METHOD AND DEVICE FOR PROCESSING A REQUEST OR COMPRESSED DIGITAL DATA

(75) Inventors: Fabrice Le Leannec, Cesson Sevigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1161 days.

(21) Appl. No.: 10/618,667

(22) Filed: Jul. 15, 2003

(65) Prior Publication Data

US 2004/0068587 A1    Apr. 8, 2004

(30) Foreign Application Priority Data

Jul. 15, 2002 (FR) .................................. 02 08900

(51) Int. Cl.
    *G06F 15/16* (2006.01)
(52) U.S. Cl. ..................... 709/247; 709/231; 382/233
(58) Field of Classification Search ................ 709/231, 709/247; 382/233
See application file for complete search history.

(56) References Cited

U.S. PATENT DOCUMENTS

| | | | |
|---|---|---|---|
| 6,247,060 B1* | 6/2001 | Boucher et al. | 709/238 |
| 6,501,860 B1 | 12/2002 | Charrier et al. | 382/240 |
| 2002/0048319 A1 | 4/2002 | Onno | 375/240 |
| 2002/0051583 A1 | 5/2002 | Brown et al. | 382/299 |
| 2002/0143972 A1* | 10/2002 | Christopoulos et al. | 709/231 |
| 2002/0191852 A1 | 12/2002 | Le Leannec et al. | 382/233 |
| 2003/0018750 A1 | 1/2003 | Onno et al. | 709/219 |
| 2003/0018818 A1* | 1/2003 | Boliek et al. | 709/247 |
| 2003/0067627 A1* | 4/2003 | Ishikawa et al. | 358/1.15 |
| 2003/0110299 A1* | 6/2003 | Larsson et al. | 709/247 |
| 2003/0113027 A1* | 6/2003 | Chan et al. | 382/240 |
| 2003/1012887 | 7/2003 | Le Leannec et al. | 382/233 |
| 2003/0174897 A1 | 9/2003 | Le Leannec et al. | 382/240 |
| 2004/0012820 A1 | 1/2004 | Donescu et al. | 358/3.28 |
| 2004/0042486 A1 | 3/2004 | Onno et al. | 370/466 |

OTHER PUBLICATIONS

"JPEG2000 Part I Final Draft International Standard (corrected and formatted)", ISO/IEC JTCI/SC29 WG1, JPEG2000, pp. 1-224, Sep. 25, 2000.
M. Marcellin et al., "An Overview of JPEG-2000," Data Compression conference, Proceedings, DCC, IEEE Computer Society Press, Los Alamitos, CA, US, pp. 523-541, Mar. 28, 2000.
"JPEG 2000 Part I Final Committee Draft Version 1.0," ISO/IEC FCD 15444-1:2000 V1. O, pp. 13-52, Mar. 16, 2000, XP002220239.
D. Taubman, "High Performance Scalable Image Compression with EBCOT," IEEE Transactions on Image Processing, IEEE Inc., New York, US, vol. 9, No. 7, pp. 1158-1170, Jul. 7, 2000.

* cited by examiner

*Primary Examiner* — Dohm Chankong
*Assistant Examiner* — Thomas J Daley
(74) *Attorney, Agent, or Firm* — Fitzpatrick, Cella, Harper & Scinto

(57) ABSTRACT

The invention relates to a method of processing a request coming from a first communication apparatus connected through a communication network to a remote second communication apparatus, the method comprising a step of receiving the request for obtaining digital data of a compressed digital signal that comprises header data and a signal body comprising in particular data packets, wherein the processing of the request comprises a step of determining the position, in the body of the signal, of at least one data packet corresponding to the request according, on the one hand, to the length of the header data and, on the other hand, to at least one pointer marker present in the signal and adapted to provide the length of the part of the body preceding the data packet under consideration.

46 Claims, 18 Drawing Sheets

METHOD AND DEVICE FOR PROCESSING A REQUEST OR COMPRESSED DIGITAL DATA

The present invention relates to a method and a device for processing a request coming from a first communication apparatus connected through a communication network to a remote second communication apparatus.

The invention also relates to a method and a device for processing compressed digital data received by the first communication apparatus.

The invention is applicable in particular in the field of processing compressed images and, for example, in the field of processing compressed images conforming to the JPEG2000 standard.

According to this standard, a compressed digital image signal has a general structure comprising header data constituting a main header and a body that comprises, in compressed form, data representing physical quantities, these being the pixels, and that are grouped together in code blocks arranged in the signal.

The body of the signal corresponds to at least one tile which represents in a compressed manner a rectangular part of the original image signal. Each tile is formed of tile header data and a tile body containing the compressed code blocks corresponding to the tile under consideration.

More particularly, the body of each tile comprises data packets which each consist of packet header data and a packet body.

In its turn the packet body contains a number of compressed code blocks and the packet header data contain in particular a list of all the blocks contained in the packet body.

Each compressed code block is a compressed representation of an elementary rectangular part of the image signal that has been transformed, in a known manner, into frequency sub-bands.

It should be noted that each code block is compressed over a number of quality levels or layers and each quality level or layer of a block is located in a separate packet.

Each data packet of an image signal conforming to the JPEG2000 standard therefore contains a set of compressed code blocks each corresponding to a given tile, component (e.g. luminance or chrominance), resolution level, quality level and precinct.

In a client/server type communication architecture, the user receives and stores a compressed digital image signal that, for example, conforms to the JPEG2000 standard.

The signal thus received is then decompressed and reconstructed in the client computer so that the user can use the image signal or part thereof if they so wish.

Transmission of the computer file containing the compressed data can take a relatively long time if the file is large.

Moreover, the transmission of such a file can be subject to interference that could make some data erroneous.

This phenomenon is accentuated when the file is large.

Moreover, it is not uncommon for problems related to the computer hardware to arise during receiving and storing of a data file and for some of the data to be lost to the user, perhaps even the entire file.

It also happens from time to time that files that are too large quite simply cannot be used by the user in view of insufficient storage and processing capacities of the computer of the user.

Furthermore, in certain situations, not all of a compressed digital signal that, for example, is an image signal, is of interest to the user.

The user may wish, in fact, to concern themselves more particularly with part of the image signal or else with a specific resolution level and not with all resolution levels, without needing to decompress the entire signal.

Thus, for various reasons, it is wished to receive only part of the compressed digital signal available at the server.

In this case, the server must search in the compressed signal for the data packets corresponding to the part of the signal requested by the user and extract them therefrom before transmitting them to the client machine.

However, this search necessitates decoding all or some of the header data of the packets of the body of the signal in order to obtain the information on the elementary respective lengths of the contributions of the code blocks contained in the body of each packet.

The length of the body of each packet is deduced from these elementary lengths and it is thus possible to find the position of the following packet in the body of the signal. This solution is all the more long and tedious to implement since it necessitates going through all or part of the body of the signal to find the packets sought in order to extract them.

It should be noted that the above is applicable both with a compressed digital image signal conforming to the JPEG2000 standard and with any type of compressed digital signal (sound signals, video signals, data signals originating from a facsimile machine or other electronic apparatus, etc.).

Consequently it would be useful to have available a new method and a new device allowing faster processing in a communication apparatus of a request issued by a remote communication apparatus and aimed at obtaining part of a compressed digital signal.

One object of the present invention is thus a method of processing a request coming from a first communication apparatus connected through a communication network to a remote second communication apparatus, the method comprising a step of receiving the request for obtaining digital data of a compressed digital signal that comprises header data and a signal body comprising in particular data packets, wherein the processing of the request comprises a step of determining the position, in the body of the signal, of at least one data packet corresponding to the request according, on the one hand, to the length of the header data and, on the other hand, to at least one pointer marker present in the signal and adapted to provide the length of the part of the body preceding the data packet under consideration.

Correlatively, the invention also relates to a device for processing a request coming from a first communication apparatus connected through a communication network to a remote second communication apparatus, the device comprising means of receiving the request for obtaining digital data of a compressed digital signal that comprises header data and a signal body comprising in particular data packets, wherein the device comprises, for processing the request, means of determining the position, in the body of the signal, of at least one data packet corresponding to the request according, on the one hand, to the length of the header data and, on the other hand, to at least one pointer marker present in the signal and adapted to provide the length of the part of the body preceding the data packet under consideration.

One or more of these pointer markers present in the signal are used according to the structure of the data present in the part of the body preceding the packet sought and the position in the signal of the packet corresponding to the request can therefore be determined by calculation.

The packet sought is thus found more quickly than in the prior art since it is not necessary to go through all or part of the body of the signal. The first communication apparatus will therefore receive more quickly the data packet or packets corresponding to its request.

Moreover, the proposed solution is simpler inasmuch as it does not require decoding of the header data of the different packets of the body of the signal.

According to one characteristic, the determination of the length of the part of the body of the signal preceding the data packet under consideration comprises a preliminary step of determining the order of appearance of said data packet in the body of the signal, according to parameters relating to the structure and organization of the data in the signal.

According to one characteristic, the compressed digital signal is partitioned into a number n of independently compressed regions $t_i$, i=1 to n and n≧1, the body of the signal comprising, for each region, region header data and a region body containing data packets of the region under consideration.

According to another characteristic dependent on the preceding one, the length of the part of the body of the signal preceding the data packet under consideration is determined from:
  at least one pointer marker adapted to provide in particular the length of the data packet or packets preceding the data packet under consideration in the region where this packet is located,
  the length of the header data of the region where the packet under consideration is located and, when one or more regions precede the region where the packet under consideration is located,
  at least one pointer marker adapted to provide in particular the length of the preceding region or regions.

Thus, from the header data, the position of a packet in the body of the signal is determined without having to perform complex operations.

Once the position of one or more packets has been determined, the method comprises a step of extracting and a step of transmitting to the first communication apparatus this or these packets.

The invention therefore makes it possible to reply quickly and simply to a request for obtaining digital data coming from the first communication apparatus.

It should be noted that the request for obtaining digital data can either specify at least one data packet of the signal, or specify part of this signal.

Where the request for obtaining data specifies part of the signal, then the method according to the invention implemented in the second communication apparatus comprises, subsequent to this request being received, a step of identifying the data packet or packets necessary for the reconstruction of the part of the signal specified.

According to another characteristic, when the pointer marker or markers necessary for implementing the invention are not present in the compressed digital signal, then the method according to the invention comprises a preliminary step of forming this or these markers in the signal.

Furthermore, when the communication apparatus sending the request, namely, for example, the client machine, receives the data packet or packets corresponding to its request, it stores them in a local file in the process of being constructed.

However, this apparatus does not know the position of the packet or packets in the file when said file will contain all the packets received (if there are a number of them) by the apparatus during the communication session.

Where the packet that is in the process of being received is intended to be positioned behind the packets already received and previously stored in the file, then this packet is written at the end of this file.

However, if the packet in the process of being received is intended to be inserted between a number of packets already stored in the file in the process of being constructed, then the process of reading/writing into this file becomes longer and more complex.

This is because the appropriate action in this case is to rewrite a large part of the file in the process of being constructed and, more particularly, to perform the following operations:
  determining the order of appearance of the received packet in the file in the process of being constructed;
  storing the codestream portion situated following the destination position of the received packet;
  writing the packet at the destination position;
  writing the stored codestream portion.

Such a process risks considerably slowing down the processing of the data packets received in the communication apparatus sending the request.

According to a second aspect of the invention, it would consequently be useful to have available a new method and a new device that allow a communication apparatus to process the data received by said communication apparatus more quickly than in the prior art.

One object of the present invention is thus a method of processing compressed digital data received by a first communication apparatus connected through a communication network to a remote second communication apparatus, the method comprising a step of receiving at least one data packet coming from a compressed digital signal present in the second apparatus and comprising a body that comprises in particular data packets, wherein the method comprises the following steps:
  determining a position at which said at least one data packet must be inserted into the body of a compressed digital signal derived from the compressed digital signal present in the second apparatus and which is capable of containing all or part of the body of this compressed digital signal, the derived signal also comprising header data, the position being determined according, on the one hand, to the length of the header data and, on the other hand, to at least one pointer marker previously received and inserted into the signal by the first apparatus and which is adapted to provide the length of the part of the body preceding said at least one data packet;
  inserting into the body of the derived signal said at least one data packet at the position thus determined.

Correlatively, the invention also relates to a device for processing compressed digital data received by a first communication apparatus connected through a communication network to a remote second communication apparatus, the device comprising means of receiving at least one data packet coming from a compressed digital signal present in the second apparatus and comprising a body that comprises in particular data packets, wherein the device comprises:
  means of determining a position at which said at least one data packet must be inserted into the body of a compressed digital signal derived from the compressed digital signal present in the second apparatus and which is capable of containing all or part of the body of this compressed digital signal, the derived signal also comprising header data, the position being determined according, on the one hand, to the length of the header data and, on the other hand, to at least one pointer marker previously received and inserted into the signal by the first apparatus and which is adapted to provide the length of the part of the body preceding said at least one data packet;
  means of inserting, into the body of the derived signal, said at least one data packet at the position thus determined.

In this second aspect of the invention, in the same way as for the first aspect of the invention set out above and with the same aim, use is made of one or more pointer markers present in the compressed digital signal available in the second apparatus and which were received by the first apparatus.

There is thus determined the exact position at which the compressed data packet or packets received must be inserted into the body of the derived signal without, for doing this, carrying out the least prior insertion of data into this body.

Thus, each packet received can be directly inserted at the correct position in the body of the derived signal. This position corresponds to the position that would be occupied by the packet concerned if all packets of the signal available in the second apparatus were received by the first apparatus.

It should however be noted that this position does not necessarily correspond to the position that was occupied by the packet in the signal available in the second apparatus.

According to one characteristic, the method according to this second aspect of the invention comprises the following preliminary steps:

receiving the header data coming from the original compressed digital signal present in the second apparatus, the received header data comprising at least one pointer marker adapted to provide the length of the body of the original signal;

from the received header data, forming the derived compressed digital signal which thus comprises, as header data, the received header data and a signal body of length equal to that of the body of the original signal, the body of the derived signal representing a space initially filled with arbitrary data and which is intended to contain the data packet or packets received from the second apparatus.

There is thus formed from the received header data a skeleton of the derived signal comprising, on the one hand, as header data, the received header data of the original signal present in the second communication apparatus and, on the other hand, a body that will be filled as data packets coming from this second apparatus are received.

When the compressed digital signal is partitioned into regions, the length of the part of the body preceding the data packet for which it is wished to determine the position is determined in an identical manner to that described for the second communication apparatus according to the invention.

Here also, the position of a data packet in the body of the derived signal in the process of being formed is determined simply and quickly in the first communication apparatus according to the invention.

According to another characteristic, the method comprises the following steps:

receiving region header data;

determining a position at which the received region header data must be inserted into the body of the derived signal, the position being determined according to the length of the header data of the derived signal and, when one or more regions precede the region header data concerned, also according to one or more pointer markers received previously and providing respectively the length of the preceding region or regions;

inserting the received region header data at the position thus determined.

When the signal is partitioned into regions there is thus determined the position of the region headers in the derived signal in the process of being formed and at which the region header data received from the second communication apparatus must be inserted into this signal.

Here again, the use of the pointer marker or markers makes it possible to determine this position simply and quickly.

According to one-characteristic, the method comprises a phase of converting the derived signal into a valid signal which comprises the following steps:

extracting from the derived signal the header data and data packets received;

forming the header data of the valid signal from the header data extracted from the derived signal;

concatenating the data packets extracted from the derived signal in the body of the valid signal; and when one or more data packets present in the body of the original signal are not received by the first apparatus, concatenating respectively one or more empty packets in the body of the valid signal in the same order of appearance as that adopted in the derived signal.

In this way, the derived signal is converted into a valid signal that, for example, where the compressed digital signal present in the second communication apparatus conforms to the JPEG2000 standard, will also prove to be, in the first apparatus, after conversion, a valid signal in the sense of the JPEG2000 standard.

This is particularly advantageous inasmuch as it will be possible to use a JPEG2000 decoder independent of the client/server architecture used.

Furthermore, inasmuch as the derived signal is distinct from the valid signal and can therefore be kept in memory in the first communication apparatus, it is possible to continue to receive data packets and store them in this derived signal during future communication sessions without it being necessary for doing this to re-form another derived signal.

It should be noted that the creation of empty packets in the body of the valid signal simulating the presence of non-received packets thus makes it possible to make said signal valid in the sense of the JPEG2000 standard.

According to another possibility, the method according to the invention comprises the following steps:

going through the data contained in the body of the derived signal;

when the data gone through do not correspond to a data packet received from the second apparatus, converting the space filled by the data concerned into an empty packet; and shifting in an adapted manner the data constituting the remainder of the body of the derived signal.

According to this approach, the derived signal is converted into a valid signal without for all that creating another signal.

The procedure thus remains inside the derived signal that will be converted, as operations are performed on its data, into a valid signal.

For this reason, the resources necessary for storing the data will be reduced compared with the previous case where a valid signal and a derived signal are kept.

The invention also relates to a communication apparatus comprising a device for processing a request or received data, according to the aspect considered, as briefly described above.

According to another aspect, the invention also relates to:

an information storage means readable by a computer or a microprocessor comprising code instructions of a computer program for executing the steps of the method according to the invention such as that briefly described above; and an information storage means that is removable, partially or totally, readable by a computer or a microprocessor comprising code instructions of a computer program for executing the steps of the method according to the invention such as that briefly described above.

According to yet another aspect, the invention relates to a computer program that can be loaded into a programmable apparatus, comprising sequences of instructions or portions of software code for implementing the steps of the method of the invention as briefly described above, when said computer program is loaded and executed by the programmable apparatus.

As the characteristics and advantages relating to the device for processing a request or received data, the communication apparatus comprising such a device, the information storage means and the computer program are the same as those described above concerning the method according to the invention, they will not be repeated here.

Other characteristics and advantages of the present invention will emerge more clearly from a reading of the following description, given with reference to the accompanying drawings, in which:

FIG. 1 depicts very schematically a client/server type communication architecture in which the invention is advantageously implemented.

Figure 1:
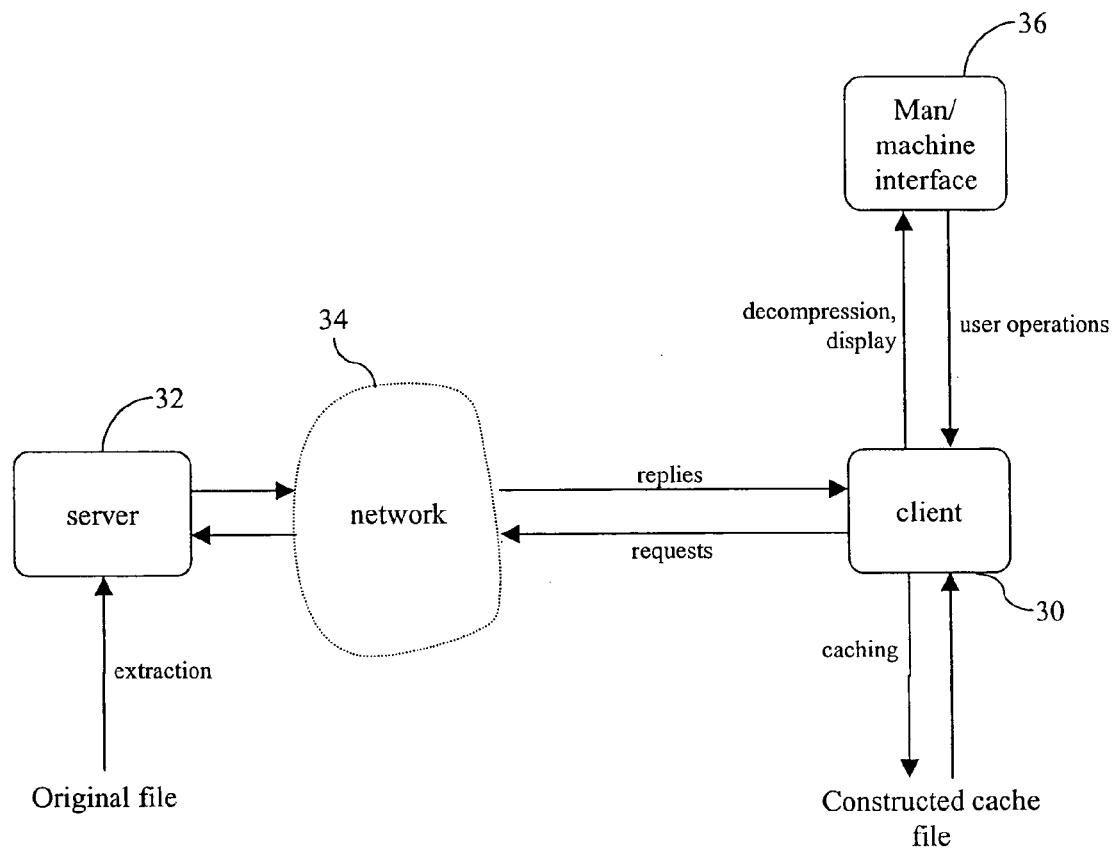
FIG. 1 depicts schematically a client/server type communication architecture in which the invention is implemented.

As depicted in FIG. 1, a first communication apparatus 30 (client machine) is connected to a second communication apparatus 32 (server) through a communication network 34.

In this architecture, a compressed digital signal, for example a compressed image signal, is stored in the server 32.

A user interacting with the client machine 30, by means of a man/machine interface 36, will seek to obtain digital data coming from the compressed signal stored at the server in order to view the image interactively. This is accompanied by the formation, in the client machine 30, of a digital signal derived from the compressed digital signal of the server.

This data exchange takes the form of requests and replies that are transmitted between the client machine 30 and the server 32 via the communication network 34.

According to a first aspect, the invention is implemented in the server 32 in order to process a request coming from the client machine 30.

According to a second aspect, the invention is implemented in the client machine 30 in order to process, therein, data received from the server 32 and, more particularly, carry out the storing ("caching") of these data.

The data thus received by the client machine 30 are stored in a cache type memory, which avoids having to transmit to the server on a number of occasions requests corresponding to one and the same signal part (region of interest) requested by the user at different times.

It should be noted that the data received by the client machine are next decompressed and displayed in order to be able to be used by the user via the man/machine interface 36.

It should be noted that, for the following description, the compressed digital signal is more particularly an image signal although it can also take the form, for example, of a video signal or an audio signal.

More particularly, the compressed digital signal corresponds to an image signal conforming to the JPEG2000 standard.

Thus, the signals stored respectively in the server 32 and in the client machine 30 are stored in the form of computer files, namely an original JPEG2000 file for the server and a so-called cache file for the client machine.

Furthermore, it should be noted that the original compressed digital signal can come from other communication apparatus connected to the server by another communication network.

In the example under consideration, the server 32 is, for example, a computer and the client machine 30, a microcomputer, or perhaps a digital photographic apparatus, a portable telephone, a Personal Digital Assistant (PDA), etc.

Moreover, the communication network 34 can, for example, be of wired or radio type.

Figure 2:
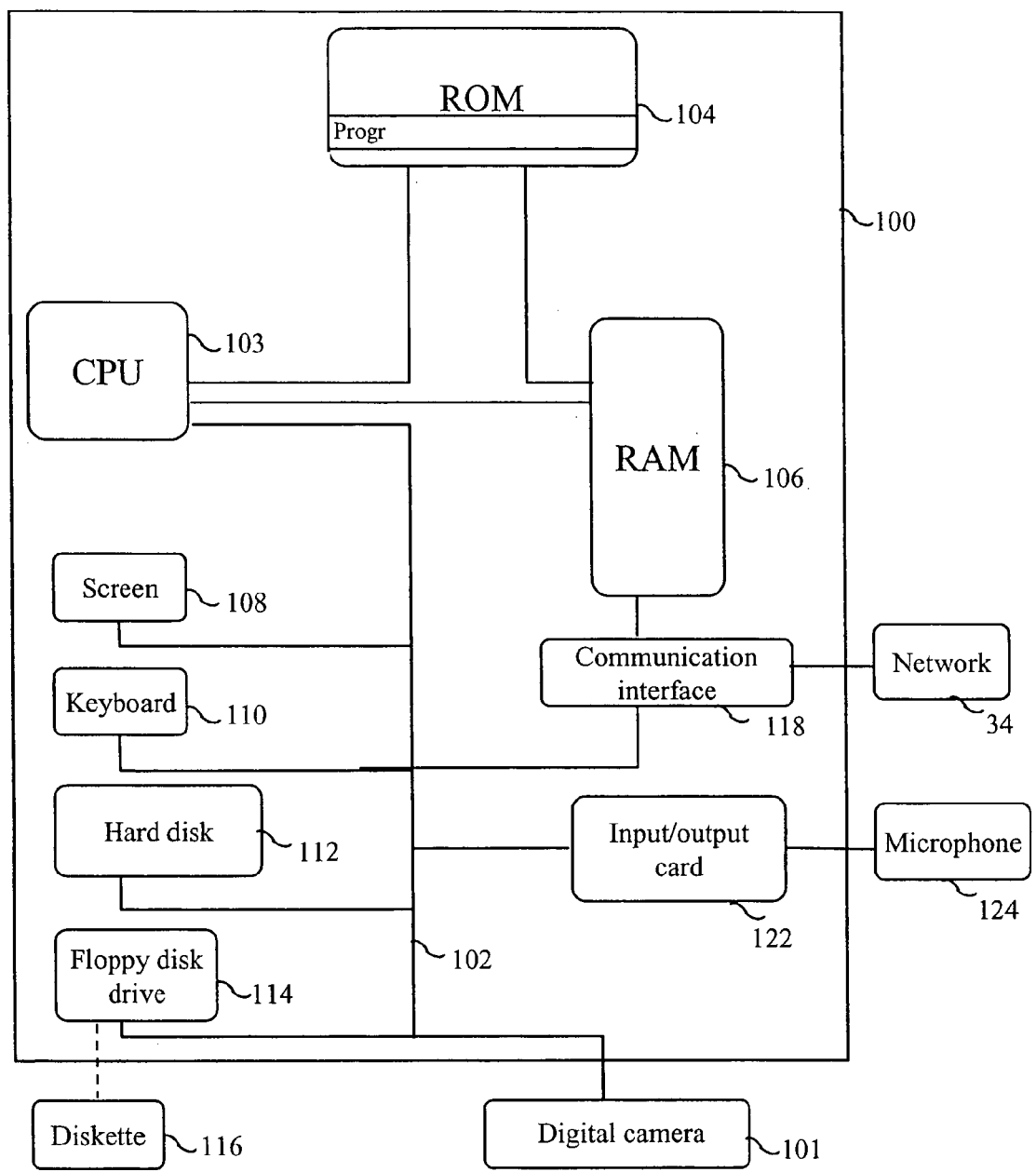
FIG. 2 depicts schematically a communication apparatus (client machine or server) in which the invention is implemented.

With reference to FIG. 2, an example of a programmable apparatus 100 implementing the invention is described. This apparatus is adapted to process a compressed digital signal or information and data coming from this signal or from a request issued by another communication apparatus.

Each communication apparatus of FIG. 1 takes, for example, the form of the apparatus of FIG. 2 which includes a device according to the invention, that is to say having all the means necessary for implementing the invention, or itself constitutes such a device according to the invention.

According to the embodiment depicted in FIG. 1, an apparatus implementing the invention is for example a computer or a microcomputer 100 connected to various peripherals, for example a digital camera 101 (or a scanner, or any image acquisition or storage means) connected to a graphics card and supplying data.

The apparatus 100 of FIG. 2 comprises a communication bus 102 to which the following are connected:
- a central unit 103 (microprocessor);
- a read-only memory 104, comprising a program "Progr";
- a random access memory 106, comprising registers adapted to record variables modified during execution of the aforementioned program;
- a screen 108 making it possible to view the decompressed data (when a client machine is concerned) or to serve as an interface with the user who can parameterize certain operating modes of the server or of the client machine as the case may be, by means of a keyboard 110 or any other means, such as for example a mouse;
- a hard disk 112;
- a floppy disk drive 114 adapted to receive a diskette 116;
- an interface for communication 118 with the communication network 34 of FIG. 1 and which is capable of processing requests coming from other communication apparatus and transmitting compressed digital data in reply to these requests or receiving compressed data which are to be processed by the apparatus;
- an input/output card 122 connected to a microphone 124 (the data to be processed according to the invention then constitute an audio signal).

The communication bus allows communication between the different elements included in the microcomputer 100 or connected thereto. The representation of the bus is not limitative and, in particular, the central unit is capable of communicating instructions to any element of the microcomputer 100 directly or by means of another element of the microcomputer 100.

The program denoted "Progr", allowing the programmable apparatus to implement the invention, can be stored for example in read-only memory 104 (called ROM on the drawing).

Although a single program is identified, it is possible to have a number of programs or subprograms for implementing the invention.

According to a variant, the diskette 116, just like the hard disk 112, can contain compressed and stored data as well as the code of the invention which, once read by the apparatus 100, will be stored on the hard disk 112.

In a second variant, the program can be received in order to be stored in an identical manner to that described previously by means of the communication network 34.

The diskettes can be replaced by any information medium such as, for example, a CD-ROM or a memory card. In general terms, an information storage means, readable by a computer or a microprocessor, integrated or not with the apparatus, possibly removable, stores a program implementing the method according to the invention.

In more general terms, the program can be loaded into one of the storage means of the apparatus 100 before being executed.

The central unit 103 will execute the instructions relating to the implementation of the invention, instructions stored in the read-only memory 104 or in the other storage elements. Upon power-up, the program or programs, which are stored in a non-volatile memory, for example the ROM memory 104, are transferred into the random access memory RAM 106 which will then contain the executable code of the invention, as well as registers for storing the variables necessary for implementing the invention.

It should be noted that the communication apparatus that is capable of implementing the invention can also be a programmed apparatus.

This apparatus then contains the code of the computer program or programs for example fixed in an application specific integrated circuit (ASIC).

Figure 3:
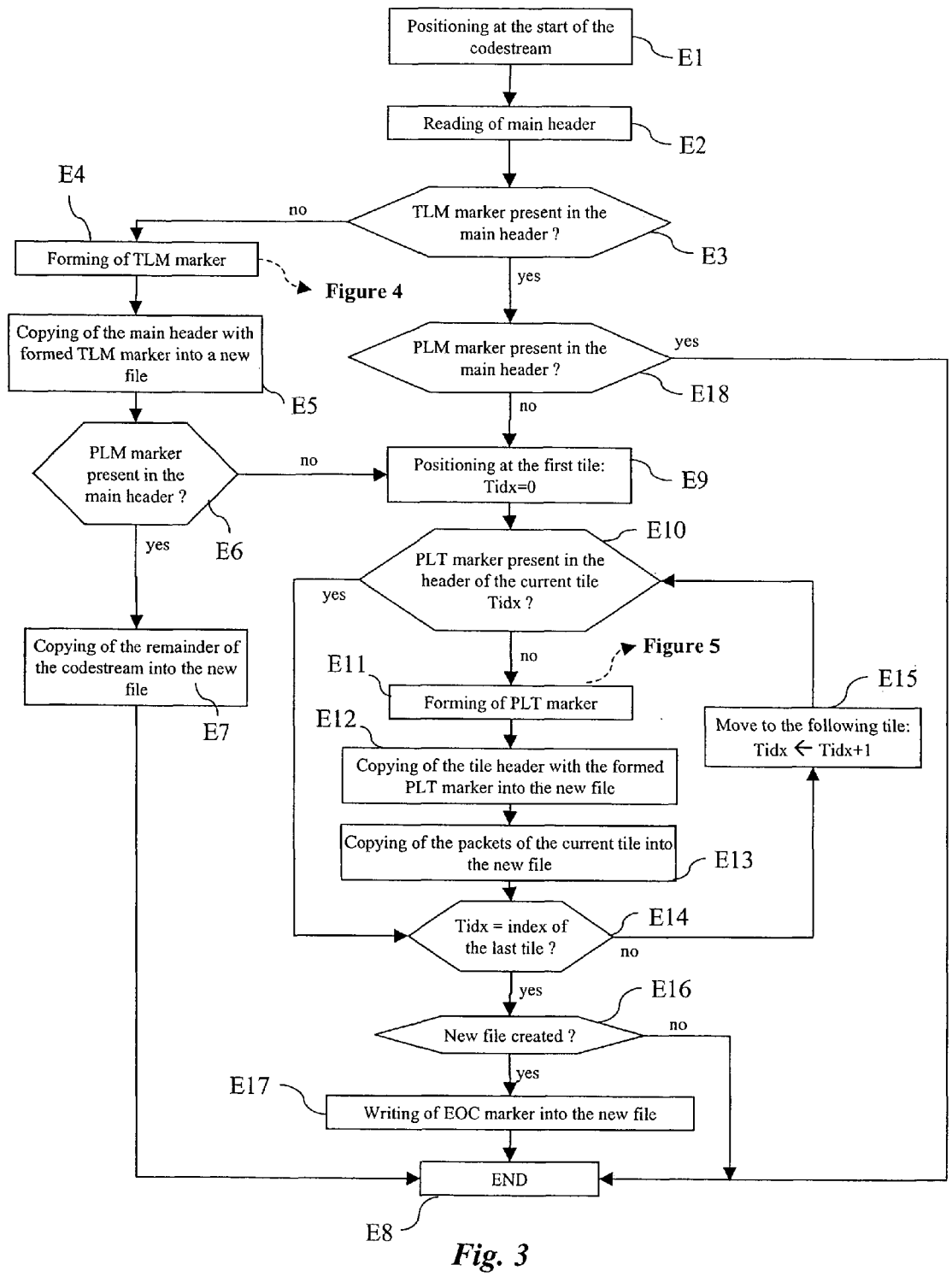
FIG. 3 depicts an algorithm for forming pointer markers.

FIG. 3 illustrates an algorithm comprising different instructions or portions of software code corresponding to steps of the method according to the invention.

The computer program denoted "Progr" that is based on this algorithm is stored in the read-only memory 104 of FIG. 2 and, at system initialization, is transferred into the random access memory 106.

The program is then executed by the central unit 103, which thus makes it possible to implement the method according to the invention in the apparatus of FIG. 2.

This algorithm is implemented at the second communication apparatus according to the invention, namely the server 32 of FIG. 1.

This algorithm describes schematically the steps that are implemented in this server for performing a transcoding of the compressed digital signal and that consists, more particularly, of forming pointer markers in the codestream of the signal, namely, in the example embodiment under consideration, the codestream of the image signal conforming to the JPEG2000 standard.

It should be noted that, according to this standard, a compressed digital image signal comprises header data constituting a main header, header data of tiles or regions $t_i$ into which the signal is partitioned (a tile represents, in a compressed manner, a rectangular part of the image signal which always comprises at least one tile) and, for each tile, a tile or region body comprising data packets that each consist of packet header data and a packet body.

In its turn the packet body contains a number of compressed code blocks that represent physical quantities, these being the pixels.

The packet header data contain in particular a list of all the blocks contained in the packet body.

Each compressed code block is a compressed representation of an elementary rectangular part of the image signal that has been transformed, in a known manner, into frequency sub-bands.

It should be noted that each code block is compressed over a number of quality levels or layers and each quality level or layer of a block is located in a separate packet.

Furthermore, the aforementioned regions or tiles $t_i$ are compressed independently.

Each data packet of an image signal conforming to the JPEG2000 standard therefore contains a set of compressed code blocks each corresponding to a given tile, component (for example: luminance or chrominance), resolution level, quality level and precinct.

Returning to the algorithm of FIG. 3, this starts with a step E1 of positioning at the start of the codestream of the image signal under consideration.

During the following step E2, provision is made to read the main header data of the signal and, during the following step E3, a test is carried out in order to determine whether a TLM pointer marker is present in the main header data.

It should be noted that the TLM pointer marker provides the lengths of the different tiles that partition the image signal.

In the case where such a marker is not present in the signal then the step E3 is followed by a step E4 of forming a TLM pointer marker in the main header data of the signal.

The formation of the TLM pointer marker will be described in more detail later, with reference to the algorithm of FIG. 4.

The step E4 is followed by a step E5 during which new main header data containing the marker thus formed are constructed by copying, into a new file, the main header data of the original signal with the TLM pointer marker thus formed.

During the following step E6, a test is provided in order to determine whether another pointer marker denoted PLM is present in the main header data of the signal.

It should be noted that this marker provides the lengths of the data packets of each of the regions or tiles into which the signal is partitioned.

When such a marker is present, then the following step E7 makes provision to copy the remaining part of the codestream constituting the image signal into the aforementioned new file, and this step is then followed by a step E8 that terminates the algorithm.

When the result of the test carried out at the step E6 is negative, then this step is followed by a step E9 during which provision is made to set the position to the first tile of the signal, namely the tile with index Tidx=0.

The following step E10 makes provision to perform a test in order to determine whether another pointer marker denoted PLT is present in the header data of the current tile Tidx.

It should be noted that this pointer marker provides a list of the lengths of the packets of the tile under consideration.

If such a marker is not present in the header data of the current tile or region under consideration, then the step E10 is followed by a step E11 of forming a PLT pointer marker.

This formation will be detailed later during the description given with reference to FIG. 5.

During the following step E12, provision is made to construct new tile header data with the PLT pointer marker thus formed, by copying these header data with this marker into the new file.

The following step E13 makes provision to copy the data packets of the current tile into the new file.

The following step E14 comprises a test in order to determine whether the current tile is the last tile of the signal.

If the answer is no, the procedure then goes to the step E15 during which the index of the current tile is incremented by one unit and the step E10 described previously is then executed again.

When the last tile of the signal has been processed, then the step E14 is followed by a step E16 during which a test is carried out in order to determine whether a new file has been created.

If the answer is no, the step E16 is directly followed by the step E8 that terminates the algorithm.

If the answer is yes, the step E16 is followed by a step E17 during which an end of codestream marker EOC is added to the end of the new codestream constructed as indicated previously.

This step is then followed by the step E8 terminating the algorithm.

Returning to the step E3, when the result of the test carried out at this step is positive, then the procedure goes to the following step E18 during which a test is carried out in order to determine whether a PLM pointer marker is present in the main header data of the signal.

It should be noted that the PLM marker provides the lengths of the packets of each tile of the image signal.

When the result of the test carried out at the step E18 is positive, then no modification is necessary and the algorithm terminates with the step E8.

When the result is negative, then the procedure goes to the following step E9 described previously during which the position is set to the first tile of the image signal.

The loop described above and consisting of the steps E9 to E15 makes it possible to go through all the tiles of the image signal in order to determine whether a PLT marker is present in their header data and, if not, to form such a marker.

It should be noted that the use of a PLT pointer marker instead of the PLM marker is preferable inasmuch as a smaller use of the bandwidth results, during the progressive transmission of parts of an image signal, in the client/server architecture depicted in FIG. 1.

This is because, inasmuch as it is only the tile header data necessary for reconstruction, in the client machine, of the part of the image signal requested by the user that are transmitted to the client machine, only the PLT pointer markers useful for reconstructing the requested part of the signal are transmitted.

On the contrary, in the case where the PLM pointer marker is transmitted to the client machine, said PLM pointer marker being very large, it follows that packet length information not necessary for decoding and reconstructing the signal part requested by the user will nevertheless be transmitted.

Figure 4:
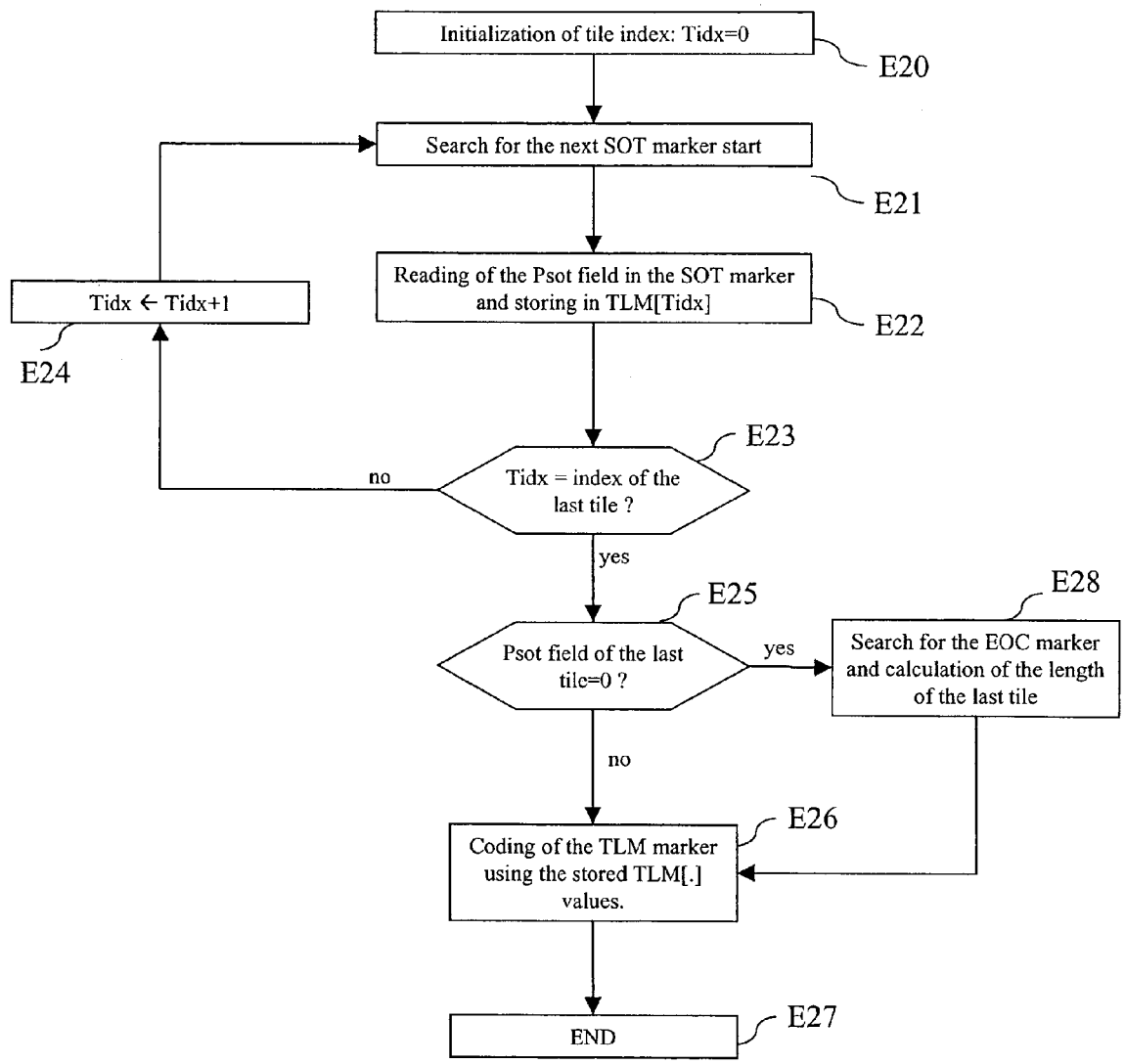
FIG. 4 is an algorithm detailing the operations performed at step E4 of the algorithm of FIG. 3.

As indicated above, the algorithm of FIG. 4 details the operations performed at the step E4 of the algorithm of FIG. 3.

This algorithm comprises different instructions or portions of software code corresponding to steps of the method according to the invention and forms part of the algorithm of FIG. 3.

The algorithm of FIG. 4 starts with a step E20 of initializing the tile index to 0 in order to set the position to the first tile Tidx=0.

During the following step E21, a search is carried out in the codestream of the image signal for a marker denoted SOT (Start of Tile) that indicates the start of a tile or region of the image.

It should be noted that each SOT marker contains a field denoted Psot that provides the total length of the tile under consideration.

During the following step E22, provision is made to read the Psot field in the SOT start of tile marker and store this field in a TLM pointer marker, for the part of this marker corresponding to the tile Tidx under consideration.

To that end, it should be noted that the TLM marker comprises a number of fields TLM (k) each corresponding to a length value of one of the tiles of index k making up the signal.

During the following step E23, a test is carried out in order to determine whether the index of the tile that has just been processed corresponds to the index of the last tile.

If the answer is no, the step E23 is followed by a step E24 during which the index of the current tile is increment by one unit, and this step is then followed by the step E21 already described above.

The step E21, for the tiles of index greater than 0, can simply consist of setting the position to $P_{SOT}$ octets further on than the start of the current tile, $P_{SOT}$ designating a field of the SOT marker containing the length in octets of the current tile.

When the result of the test carried out at the step E23 is positive, then all tiles of the image signal have been examined, and the procedure goes to the following step E25 during which a test is carried out in order to determine whether the aforementioned Psot field for the last tile examined is zero.

If the answer is no, the step E25 is followed by a step E26 during which a coding is performed of the TLM pointer marker that has been formed for all the tiles of the image signal, during execution of the loop consisting of the steps E21 to E24.

The coding is performed using the values of the TLM marker obtained and stored for each tile considered of the image signal.

It should be noted that such a coding is known to persons skilled in the art according to the document "JPEG2000 Part I Final Draft International Standards (corrected and formatted)", ISO/IEC JTCI/SC29 WG1, JPEG2000, September 2000.

The following step E27 then terminates the algorithm of FIG. 4.

Returning to the step E25, when the result of the test carried out at this step is positive, then the procedure goes to the following step E28 during which a search is carried out for the end of codestream marker EOC and the length of the last tile of the signal is calculated.

The step E28 is next followed by the step E26 already described above.

As indicated above, the formation of the PLT pointer marker provided for at the step E11 of FIG. 4 will now be described in a more detailed manner with reference to the algorithm of FIG. 5.

This algorithm comprises different instructions or portions of software codes corresponding to steps of the method according to the invention and also forms part of the algorithm of FIG. 3.

Figure 5:
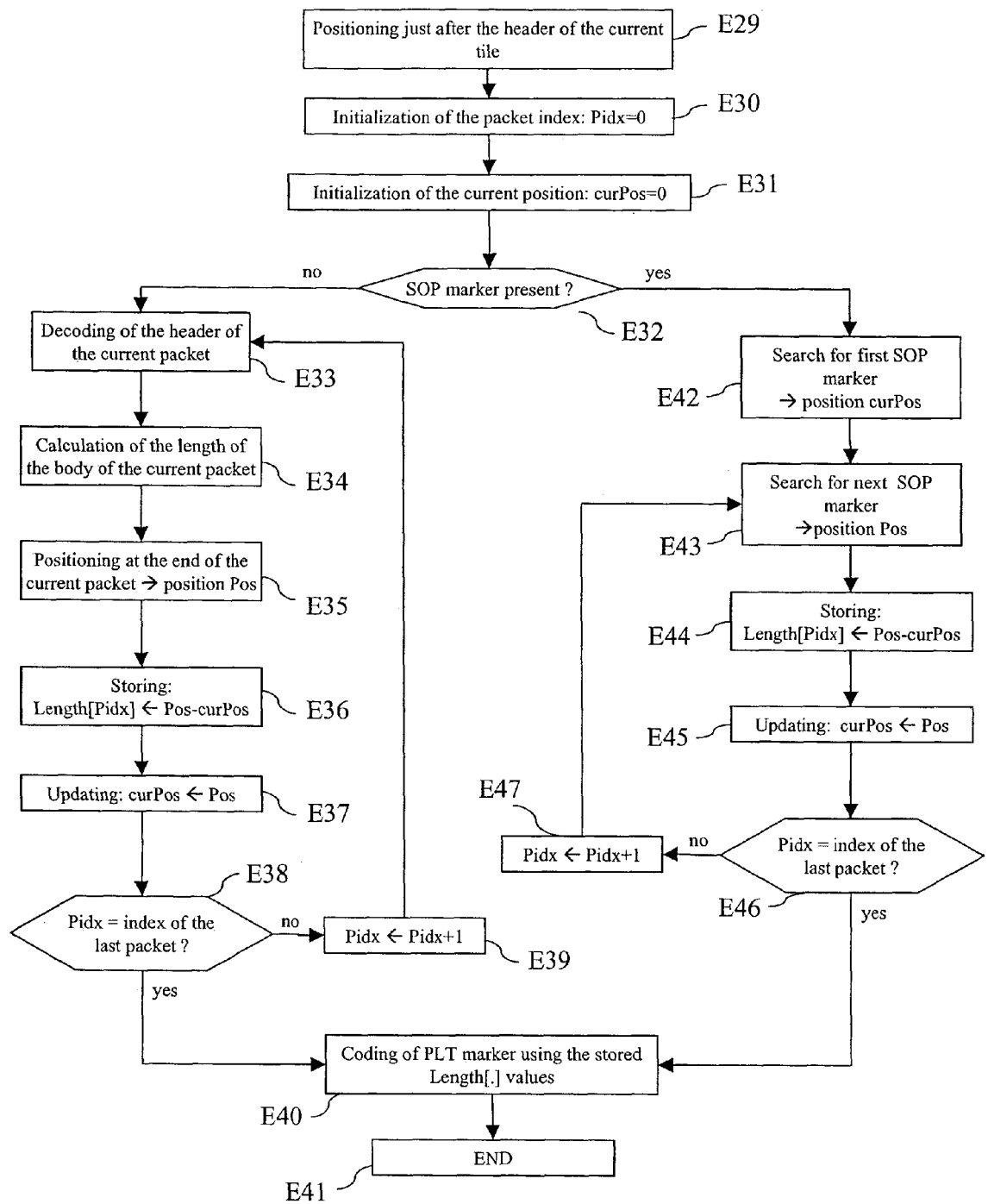
FIG. 5 is an algorithm detailing the operations performed at step E11 of the algorithm of FIG. 3.

The algorithm of FIG. 5 starts with a step E29 which makes provision to set the position to just after the header data of the current tile.

This step is followed by a step E30 of initializing the packet index to a first packet of index Pidx=0.

During the following step E31, an initialization is performed of the current position of the packet under consideration in the codestream, this position curPos being initialized to 0.

During the following step E32, a test is carried out in order to determine whether a SOP marker is present in the body of the tile under consideration.

It should be noted that this SOP (Start of Packet) marker provides the indication of the start of each packet in the tile body under consideration.

It should be noted that, in general terms, this algorithm aims to search for the successive SOP markers present in the body of the tile under consideration, the difference in position in the codestream between two successive SOP markers providing the length of the packet starting at the first of these two markers.

Returning to the step E32, when the SOP marker is not present in the tile under consideration, then the following step E33 makes provision to decode the header of the current packet examined and thus set the position to the start of the body of this packet.

The decoding of the header thus provides the lengths of the contributions of each code block of the packet to the body thereof.

During the following step E34, the length of the body of the current packet is calculated by adding the lengths of the contributions of each code block of the packet.

The following step E35 makes provision to set the position to the end of the current packet, which corresponds to the position Pos.

During the following step E36, the length of the total packet Length [Pidx] is calculated as being equal to the difference between the current position Pos in the codestream and the position curPos corresponding to the start of the current packet.

During these steps, the length of the packet under consideration is also stored.

During the following step E37, provision is made to update the current position curPos which becomes that corresponding to the position Pos of the end of the current packet.

During the following step E38, a test is carried out in order to determine whether the current index Pidx corresponds to the index of the last packet.

If the answer is no, this step is followed by a step E39 of incrementing the index of the current packet by one unit.

The step E39 is next followed by the step E33 already described above.

If the answer is yes, the step E38 is followed by a step E40 where a pointer marker denoted PLT is coded using the packet length values obtained and stored at the aforementioned step E36.

Similarly to what was described with reference to the step E26 of the algorithm of FIG. 4, such a coding is known to persons skilled in the art.

The step E40 is next followed by a step E41 terminating the algorithm of FIG. 5.

Returning to the step E32, when the result of the test carried out at this step is positive, then the procedure goes to the following step E42 which makes provision to search for the first SOP marker present in the tile under consideration, this marker thus providing the current reference position curPos.

During the following step E43, provision is made to search for the next SOP marker and identify its position which is then denoted Pos.

The following step E44 makes provision, on the one hand, to determine the length of the packet placed between the two SOP markers respectively identified at the steps E42 and E43 by calculating the difference Pos−curPos and, on the other hand, to store this packet length Length [Pidx].

During the following step E45, provision is made to update the current position in the codestream which then becomes that of the marker identified at the step E43, namely Pos.

The algorithm of FIG. 5 next comprises a test E46 in order to ascertain whether the current index of the packet Pidx corresponds to the index of the last packet of the tile under consideration.

If the answer is no, this step is followed by a step E47 of incrementing the index of the packet by one unit.

The step E47 is next followed by the step E43 already described above.

When the result of the test carried out at the step E46 is positive, then this step is followed by the step E40 of coding a PLT marker for the tile under consideration from the length values obtained and stored at the step E44.

The step E40 already described above is next followed by the step E41 terminating the algorithm.

Figure 6:
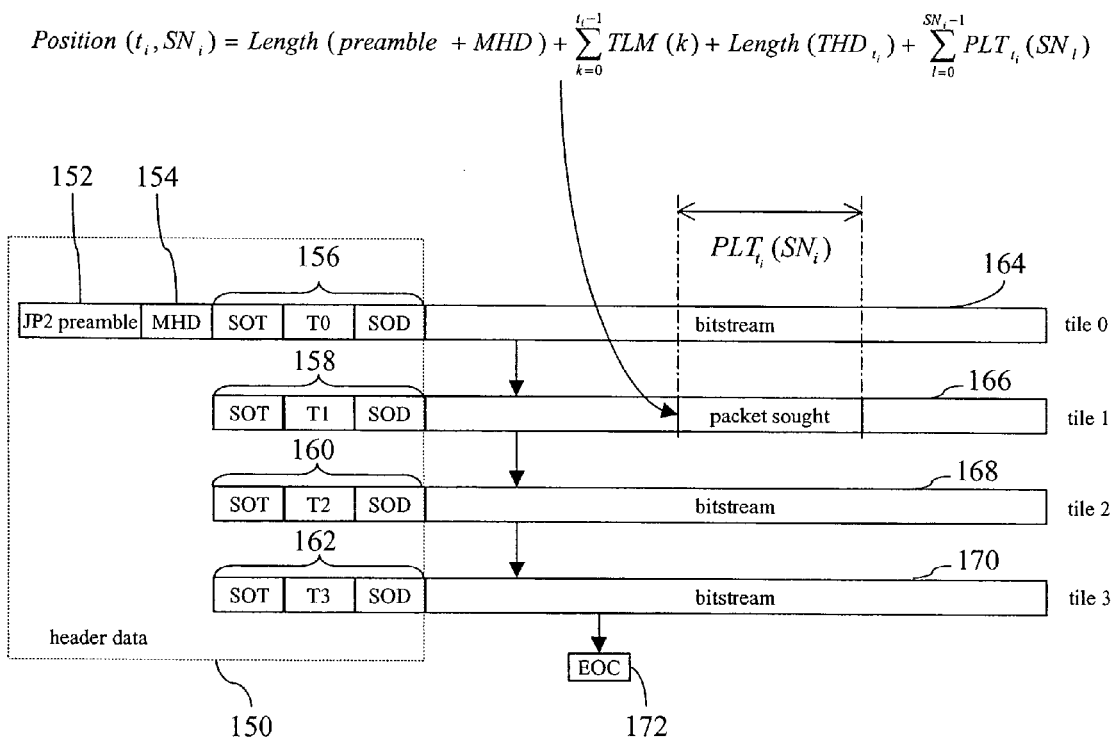
FIG. 6 is a schematic representation of the structure of a codestream of an image signal conforming to the JPEG2000 standard.

FIG. 6 illustrates schematically the structure of a codestream of an image signal conforming to the JPEG2000 standard, the image signal being partitioned into four tiles or regions 0, 1, 2 and 3.

This figure also illustrates very schematically the mechanism for determining the position of a particular data packet in the codestream.

This mechanism will be described later.

Thus, FIG. 6 shows signal header data 150 that consist of a preamble 152 containing metadata, a main header MHD referenced 154 and tile headers 156, 158, 160 and 162 corresponding respectively to the header data of tiles 0, 1, 2 and 3.

Each tile header comprises a SOT marker indicating the start of the tile under consideration, data $T_i$, where i designates the index of the tile under consideration, and a SOD marker indicating the end of the tile header.

It should be noted that the data $T_i$ contain markers indicating coding and organization parameters of the codestream for the tile of index i.

Furthermore, as depicted in FIG. 6, each tile comprises, not only tile header data as just seen, but also a tile body referenced 164 for tile 0, 166 for tile 1, 168 for tile 2 and 170 for tile 3.

These tile bodies contain the data packets of the tile under consideration which themselves consist of code blocks as explained above.

Finally, an EOC (End of Codestream) marker referenced 172 indicates the end of the image signal.

Figure 7:
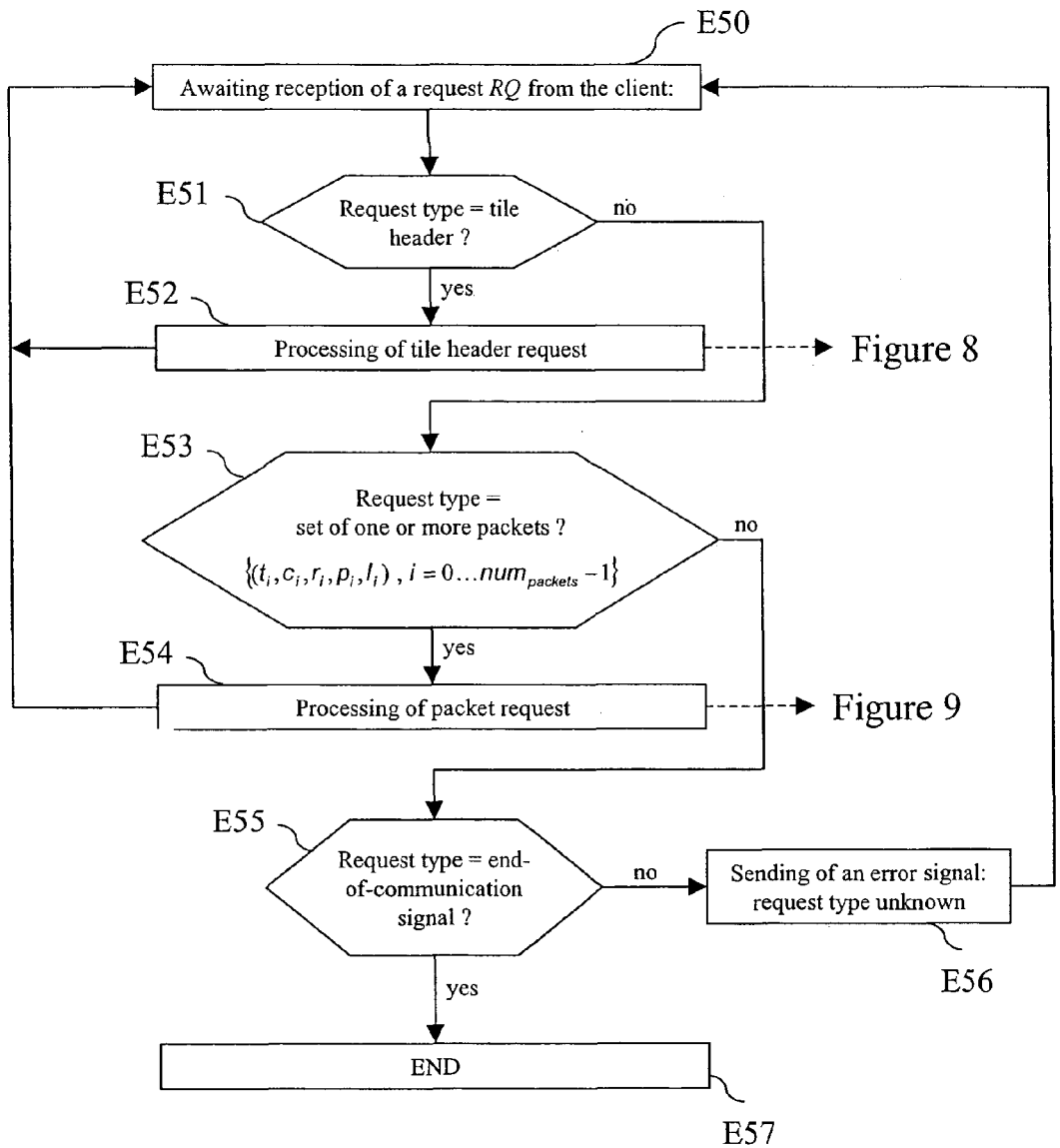
FIG. 7 is an algorithm for processing a request implemented by the second communication apparatus (server)

FIG. 7 is an algorithm comprising different instructions or portions of code corresponding to steps of the method of processing a request according to the invention.

This algorithm is implemented in the second communication apparatus (server) depicted in FIG. 1.

The computer program "Progr" stored in the apparatus of FIG. 2 is also based on this algorithm for its execution.

The algorithm of FIG. 7 starts with a step E50 awaiting reception of a request RQ coming from the first communication apparatus (client machine) depicted in FIG. 1.

After reception of a request, the step E50 is followed by a step E51 during which a test is carried out in order to determine the request type and, more particularly, whether it is a request aimed at obtaining tile header data.

In the affirmative, the step E51 is followed by a step E52 that provides for the processing of the request relating to the tile header data, which activates the execution of the algorithm of FIG. 8 as indicated below.

Figure 8:
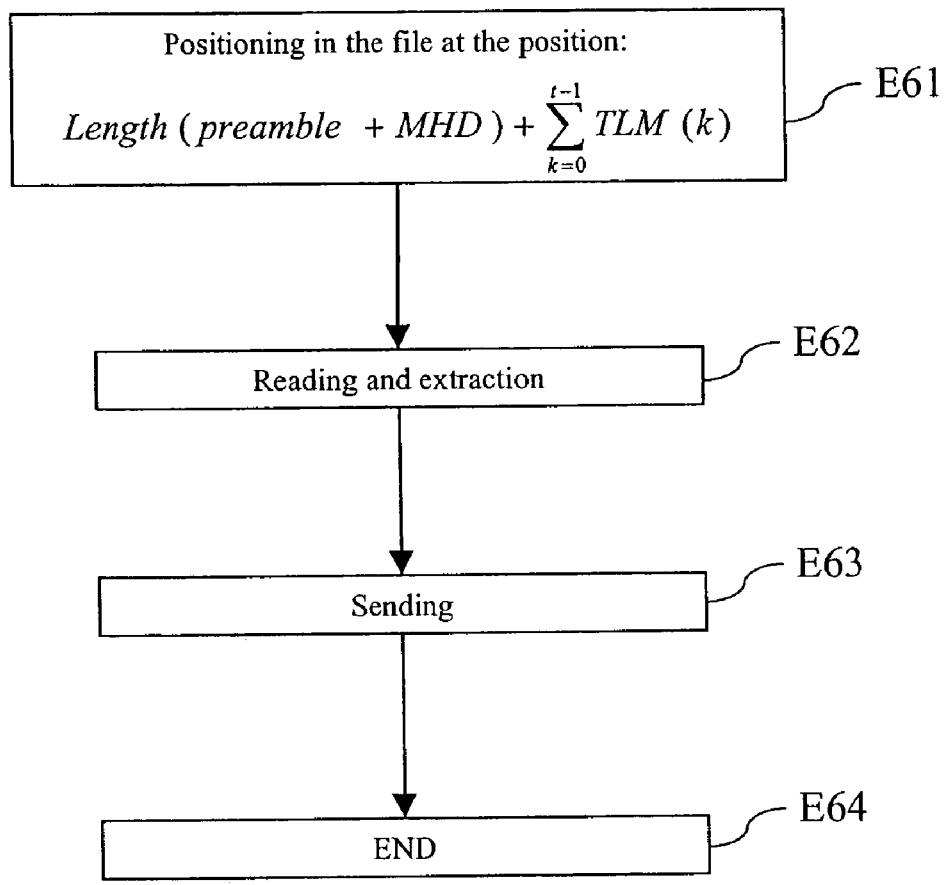
FIG. 8 is an algorithm detailing the operations performed at step E52 of the algorithm of FIG. 7.

As depicted in FIG. 8, the algorithm comprises different instructions or portions of software code corresponding to steps of the method of processing a request according to the invention and forms part of the algorithm of FIG. 7.

In general terms, the algorithm of FIG. 8 relates to determination of the position of the tile header data asked for in the request, as well as their extraction from the codestream of the image signal under consideration and their transmission to the communication apparatus (client machine) from which the request comes.

The algorithm of FIG. 8 starts with a step E61 during which the position is determined, in the codestream of the image signal, of the start of the requested tile header data.

To do this, use is made of the TLM pointer marker that is present in the signal, as explained during the description given with reference to the aforementioned FIGS. 3 and 4.

In fact, the reading of the main header data, denoted 154 in FIG. 6, provides the length of these header data, as well as information contained in the TLM pointer marker, namely the lengths of the different tiles of the signal, the value contained in the field TLM (k) providing the length of the tile of index k.

Therefore, the position of the tile sought in the signal is provided by the following expression:

$$\text{Length}(\text{preamble} + MHD) + \sum_{k=0}^{t-1} TLM(k),$$

where k is the index of the tile under consideration.

Thus, taking again the example of FIG. 6, if tile 2 is being sought, the above expression provides the length of the main header data 154 including the preamble 152, and the length of tiles 0 and 1.

The following step E62 makes provision to read the header data of the tile t under consideration, namely the header data 160 in the example mentioned above, up to the SOD marker indicating the end of the tile header data.

Also during the step E62, the series of octets corresponding to the tile header data sought are extracted.

The following step E63 makes provision to transmit the series of octets thus read at the preceding step to the first communication apparatus (client machine) depicted in FIG. 1.

It should be noted that the tile header data thus identified and extracted from the codestream can be transmitted marker by marker and not at one go.

The algorithm of FIG. 8 is then terminated by the step E64 and the step E52 of the algorithm of FIG. 7 is then followed by the step E50 already described.

It should also be noted that, when the tile header data are read at the step E62, the values of the packet lengths that are contained in the PLT pointer marker mentioned during the description given with reference to FIGS. 3 and 5 are also read and will be used later during the description given with reference to the algorithm of FIG. 9.

Returning to the algorithm of FIG. 7, when the result of the test carried out at the step E51 is negative (the request does not relate to tile header data), then this step is followed by a step E53 that is aimed at continuing the analysis of the request.

During this step, a test is carried out in order to determine whether the request relates to one or more data packets of the signal.

Figure 9:
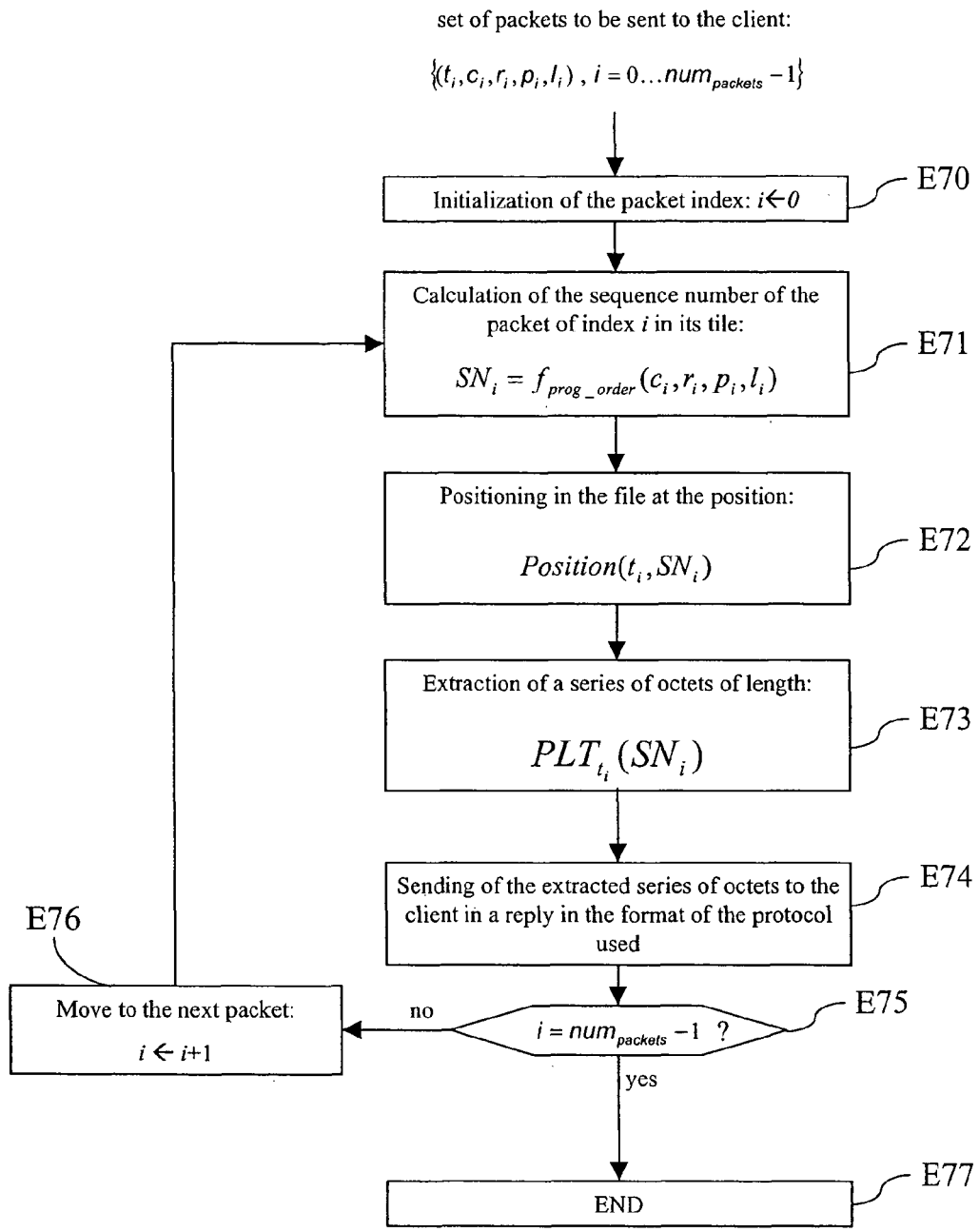
FIG. 9 is an algorithm detailing the operations performed at step E54 of the algorithm of FIG. 7.

In the affirmative, this step is followed by a step E54 aimed at processing the packet request, which activates the execution of the algorithm of FIG. 9.

The algorithm of FIG. 9 that forms part of the algorithm of FIG. 7 details the operations for processing a packet request as indicated below.

This algorithm comprises different instructions or portions of software code corresponding to steps of the method of processing a request according to the invention.

The algorithm of FIG. 9 is aimed more particularly at processing a request relating to a set of packets $(t_i, c_i, r_i, p_i, l_i)$ where i=0 to $\text{num}_{packets}-1$.

This algorithm starts with a step E70 of initializing the packet index i to the value 0.

It should be noted that the notations t, c, r, p and l correspond respectively to the tile, component, resolution level, precinct and quality layer numbers associated with the data packets under consideration.

During the following step E71, there is first determined the order of appearance of the data packet concerned in the body of the tile $t_i$ under consideration, according to parameters relating to the structure and organization of the data in the signal.

More particularly, these parameters are provided by the header data of the signal.

The sequence number of the packet under consideration which is determined according to the progression order of the data in the codestream constituting the image signal is provided by a mathematical function $f_{prog-order}$ that depends on the parameters of the packet and the progression order.

For the remainder of the description, the following notations will be used:

numPrec(c,r) corresponds to the number of precincts contained in resolution level r of component c;

nC corresponds to the number of components of the image signal;

nL corresponds to the number of quality layers in the tile under consideration.

Thus, the order of appearance of the packet in the body of the signal, that is to say the number of this packet, is provided by the following expressions that depend on the progression order considered in the signal:

Resolution-Layer-Component-Precinct order:

$$f_{RLCP}(c, r, p, l) = \sum_{R=0}^{r-1} \sum_{L=0}^{nL-1} \sum_{C=0}^{nC-1} numPrec(C, R) +$$

$$\sum_{L=0}^{l-1} \sum_{C=0}^{nC-1} numPrec(C, r) +$$

$$\sum_{C=0}^{c-1} numPrec(C, r) + p$$

Layer-Resolution-Component-Precinct order:

$$f_{LRCP}(c, r, p, l) = \sum_{L=0}^{l-1} \sum_{R=0}^{nR-1} \sum_{C=0}^{nC-1} numPrec(C, R) +$$

$$\sum_{R=0}^{r-1} \sum_{C=0}^{nC-1} numPrec(C, R) +$$

$$\sum_{C=0}^{c-1} numPrec(C, r) + p$$

Resolution-Precinct-Component-Layer order: to calculate the sequence number sought for this progression order, it is necessary to determine first of all the coordinates (x,y) of the precinct p under consideration in the reference grid, which is performed in a known manner as follows:

$$x = \begin{cases} tx_0 \text{ if } p \bmod numPrecWide(c, r) = 0 \\ XRSIZ(c) \cdot 2^{N_{DL}-r} \cdot 2^{PP_x(r,c)} \times k_x \end{cases}$$

$$y = \begin{cases} ty_0 \text{ if } p \bmod numPrecWide(c, r) = 0 \\ YRSIZ(c) \cdot 2^{N_{DL}-r} \cdot 2^{PP_y(r,c)} \times k_y \end{cases}$$

$$\text{where}: \begin{cases} k_x = p \bmod numPrecWide(c, r) + \lfloor trx_0 / \cdot 2^{PP_x(r,c)} \rfloor \\ k_y = p \text{ div } numPrecWide(c, r) + \lfloor try_0 / \cdot 2^{PP_y(r,c)} \rfloor \end{cases}$$

In the above expressions, the quantities numPrecWide (c,r), XRSIZ, YRSIZ, tx0, ty0, trx0, try0, PPx and PPy are known to persons skilled in the art and are defined in the document "JPEG2000 Part I Final Draft International Standards (corrected and formatted)", ISO/IEC JTCI/SC29 WG1, JPEG2000, September 2000. The quantity $N_{DL}$ represents the number of levels of decomposition into sub-bands in the component under consideration.

Once these quantities have been calculated, the sequence number sought is given by the following formula:

$$f_{RPCL}(c, r, p, l) = \sum_{R=0}^{r-1} \sum_{C=0}^{nC-1} numPrec(C, R) \cdot nL +$$

$$\sum_{C=0}^{nC-1} nPrecBefore(r, C, x-1, y) \cdot nL +$$

$$\sum_{C=0}^{c-1} precExists(res, C, x, y) \cdot nL + l$$

where precExists(r,c,x,y) is equal to 1 if a precinct exists at the coordinates (x,y) in component c and resolution level r, and is equal to 0 otherwise. Furthermore, the function nPrecBefore(r,c,x−1,y) represents the number of precincts preceding the position (x−1,y), inclusive, in component c and resolution level r. It is given by the following expression (provided by the JPEG2000 standard):

$$nPrecBefore(r, c, x-1, y) = \left\lfloor \frac{\left\lceil \frac{x-1}{XRSIZ(c) \cdot 2^{N_{DL}-r}} \right\rceil}{2^{PP_x(r,c)}} \right\rfloor - \left\lfloor \frac{trx_0}{2^{PP_x(r,c)}} \right\rfloor +$$

$$numPrecWide(r, c) \cdot \left( \left\lfloor \frac{\left\lceil \frac{y}{YRSIZ(c) \cdot 2^{N_{DL}-r}} \right\rceil}{2^{PP_y(r,c)}} \right\rfloor - \left\lfloor \frac{try_0}{2^{PP_y(r,c)}} \right\rfloor \right)$$

Precinct-Component-Resolution-Layer order: in the same way as for the previous progression order, the sequence number is given by the following expression:

$$f_{PCRL}(c, r, p, l) = \sum_{C=0}^{nC-1} \sum_{R=0}^{nR-1} nPrecBefore(C, R, x-1, y) \cdot nL +$$

$$\sum_{C=0}^{c-1} \sum_{R=0}^{r-1} precExists(R, C, x, y) \cdot nL + l$$

Component-Precinct-Resolution-Layer order:

$$f_{CPRL}(c, r, p, l) = \sum_{C=0}^{c-1} \sum_{R=0}^{nR-1} numPrec(C, R) \cdot nL +$$

$$\sum_{R=0}^{nR-1} nPrecBefore(c, R, x-1, y) \cdot nL +$$

$$\sum_{R=0}^{r-1} precExixts(c, R, x, y) \cdot nL + l$$

It should be noted that the calculation of the quantity num-Prec(c,r) is known to persons skilled in the art and is provided by Part I of the JPEG2000 standard for which the references have been given above.

The number of the order of appearance (sequence number) of the packet of index i in the tile under consideration is thus provided by the expression $SN_i = f_{Prog\text{-}order}(c_i, r_i, p_i, l_i)$.

The step E71 is next followed by a step E72 during which the processing of the request makes provision to determine the position of the data packet under consideration in the body of the signal according, on the one hand, to the length of the header data and, on the other hand, to at least one pointer marker present in the signal and that is adapted to provide the length of the part of the body preceding the packet under consideration.

More particularly, this position is determined according to:
the length of the main header data of the signal;
the lengths of the regions or tiles into which the signal is partitioned and which precede the tile where the packet sought is located;
the length of the header data of the current region or tile containing the packet sought;
and the length of the data packets that precede the data packet sought in the region or tile where this packet is located.

More particularly, the length of the regions or tiles preceding that of index t where the packet sought is located is provided by the corresponding part of the data constituting the TLM pointer marker and which are denoted TLM (k), where k=0 to t−1.

Furthermore, the length of the data packets preceding the data packet under consideration in the region or tile where this packet is located is provided by the values of the lengths of the packets of the tile present in the PLT pointer marker of the tile under consideration.

Thus, the expression of the position of the packet of sequence number $SN_i$ (order of appearance in the body of the signal) is provided by the following expression:

$$\text{Position}(t_i, SN_i) = \text{Length}(\text{preamble} + MHD) +$$
$$\sum_{k=0}^{t_j-1} TLM(k) + \text{Length}(THD_{t_i}) +$$
$$\sum_{l=0}^{SN_i-1} PLT_{t_i}(SN_i),$$

where Length($THD_{t_i}$) represents the length of the header data of the current region or tile $t_i$.

FIG. 6 illustrates the mechanism for determining the position of the packet sought, said packet being depicted in the body of tile 1.

This figure also shows the length $PLT_{t_i}(SN_i)$ of the packet sought in a tile of the signal.

It can thus be seen that the use of the TLM and PLT pointer markers provides a simple means for determining the position of the packet sought in the body of the signal without having to go through all or part of the codestream of the signal.

Furthermore, the use of these markers makes it possible to no longer have to decode the header data of the packets of the codestream.

The invention thus makes it possible to considerably simplify a task that previously proved relatively complex.

The use of the TLM and PLT pointer markers also makes it possible to succeed more quickly than previously in determining the position of the data packet or packets sought.

The algorithm of FIG. 9 next comprises a step E73 of extracting a series of octets of length $PLT_{t_i}(SN_i)$ corresponding to the length of the packet whose position has just been determined at the step E72 and which is depicted in FIG. 6.

The following step E74 makes provision to transmit, to the first communication apparatus (client machine) depicted in FIG. 1, the series of octets extracted at the preceding step and corresponding to one of the data packets specified in the request.

It should be noted that this reply consequent upon the request coming from the first communication apparatus is made in the format of the protocol used for the data transmission.

The step E74 is then followed by a step E75 which makes provision to perform a test on the packet index, in order to determine whether all the packets referred to in the request have been found, extracted and transmitted to the first communication apparatus.

If the answer is no, this step is followed by a step E76 of incrementing the packet index i by one unit, in order to process the next packet specified in the request, and the procedure then goes to the step E71 already described above.

When the packet index i corresponds to the value $\text{num}_{packets}-1$, then the algorithm is terminated by a step E77.

Returning to FIG. 7, the end of the algorithm of FIG. 9 marks the end of execution of the step E54, and this is followed by the step E50 described previously.

During this step, the second communication apparatus (server) awaits reception of a next request RQ coming from the first communication apparatus (client machine).

Returning to the step E53 of FIG. 7, when the result of the test carried out at this step is negative, then an additional test is carried out at the following step E55.

During this step, the test carried out is aimed at ascertaining whether the request received from the first communication apparatus corresponds to an end-of-communication signal.

If the answer is no, the step E55 is followed by a step E56 during which provision is made to send an error signal to the first communication apparatus, in order to inform it that the received request is of unknown type.

The step E56 is then followed by the step E50 described previously.

When the result of the test carried out at the step E55 is positive, that is to say the request refers to an end-of-communication signal, then the algorithm of FIG. 7 is terminated by the step E57.

Figure 10:
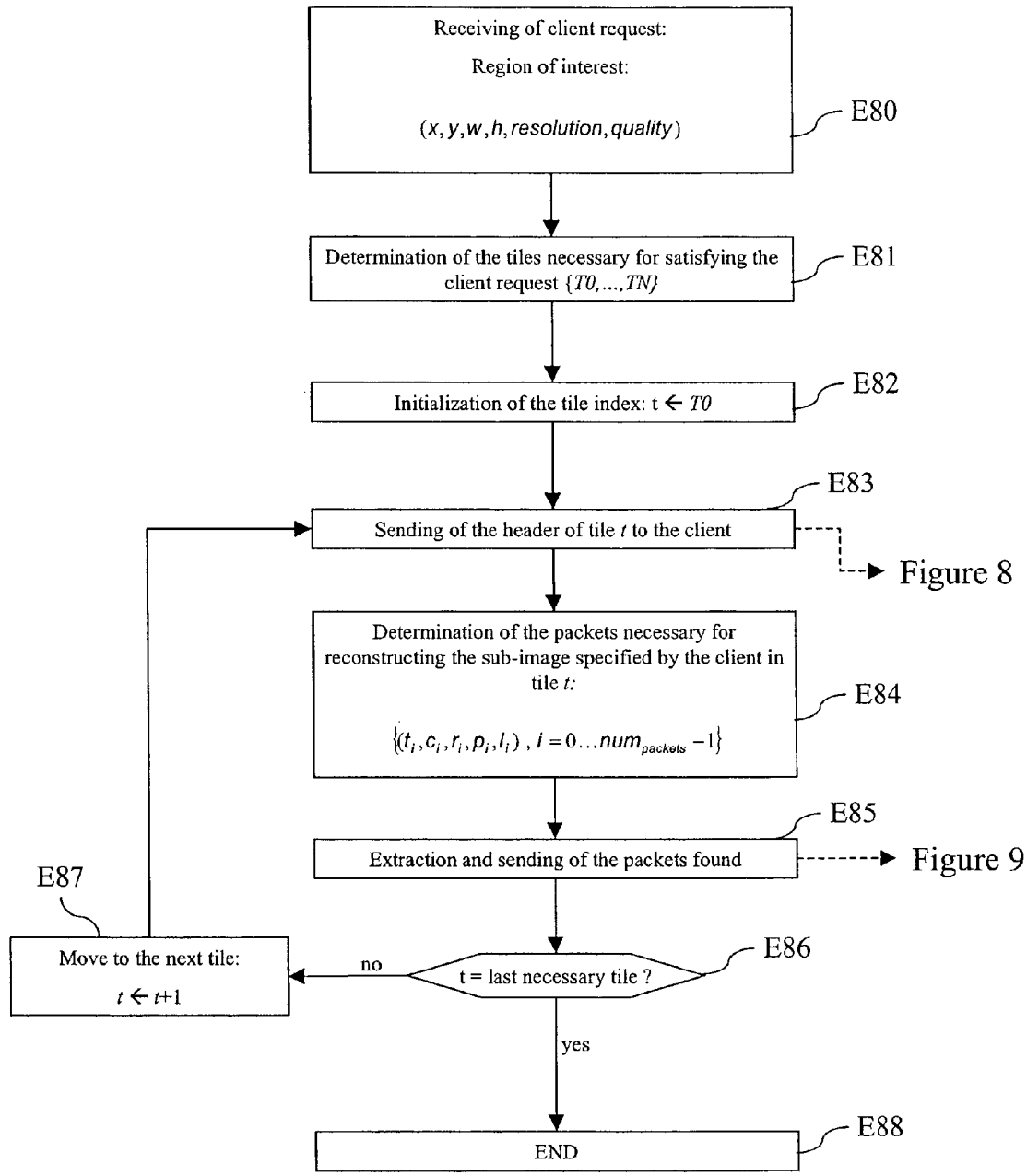
FIG. 10 is an algorithm implemented by the second communication apparatus (server) and which relates to the processing of a request specifying a region of interest desired by the user.

The algorithm of FIG. 10 relates to an algorithm for processing a request received by the second communication apparatus (server) of FIG. 1, where this request specifies part of the image signal present in this apparatus.

More particularly, this signal part describes a region of interest of the image that is desired by the user at the first communication apparatus (client machine) of FIG. 1.

The algorithm of FIG. 10 comprises different instructions or portions of code corresponding to steps of the method of processing a request according to the invention.

The computer program "Progr" stored in the apparatus of FIG. 2 is also based on the algorithm of FIG. 10.

This algorithm starts with a step E80 of receiving a request coming from the first communication apparatus and which specifies the positions (x, y) and dimensions (w, h) of the part of the signal desired, as well as the resolution level and the reconstruction quality level requested by the user.

The step E80 is followed by a step E81 during which the second communication apparatus determines the tiles or regions of the image signal that are necessary for satisfying the received request.

There should be noted for example the set of tiles necessary for satisfying this request: T0, . . . TN.

The following step E82 makes provision to initialize the tile index t to the value T0.

The following step E83 calls upon the algorithm of FIG. 8 for transmitting to the first communication apparatus (client machine) the tile header data corresponding to the current tile.

Once these tile header data have been transmitted, the second communication apparatus must determine, for the tile under consideration, the data packets of the codestream of the image signal that are necessary for reconstructing the part of the signal referred to in the request.

This necessitates a projection of the part of the signal under consideration into the frequency sub-bands of the image.

As soon as the packets necessary for reconstructing the part of the signal required by the client in the tile t under consideration have been determined, then the step E84 is followed by the step E85.

This step is aimed at extracting and transmitting to the first communication apparatus (client machine) the data packets corresponding to the request and that were identified at the step E84.

It should be noted that, for implementing the step E85, it is necessary to call upon the algorithm of FIG. 9 that makes provision for determining the position of each packet in the codestream, its extraction and its transmission.

The step E85 is then followed by a step E86 during which a test is carried out in order to determine whether the necessary tile under consideration of index t is the last tile in the set of tiles necessary for satisfying the client request.

If the answer is no, the step E87 is performed.

During this step, provision is made to increment the index value t by one unit in order to process, in the algorithm of FIG. 10, the next tile necessary (step E83) for satisfying the request of the client.

When the result of the test carried out at the step E86 is positive, then all the tiles necessary for satisfying the request of the client have been processed and the corresponding packets transmitted to the first communication apparatus (client machine).

The algorithm of FIG. 10 is then terminated by the step E88.

Figure 11:
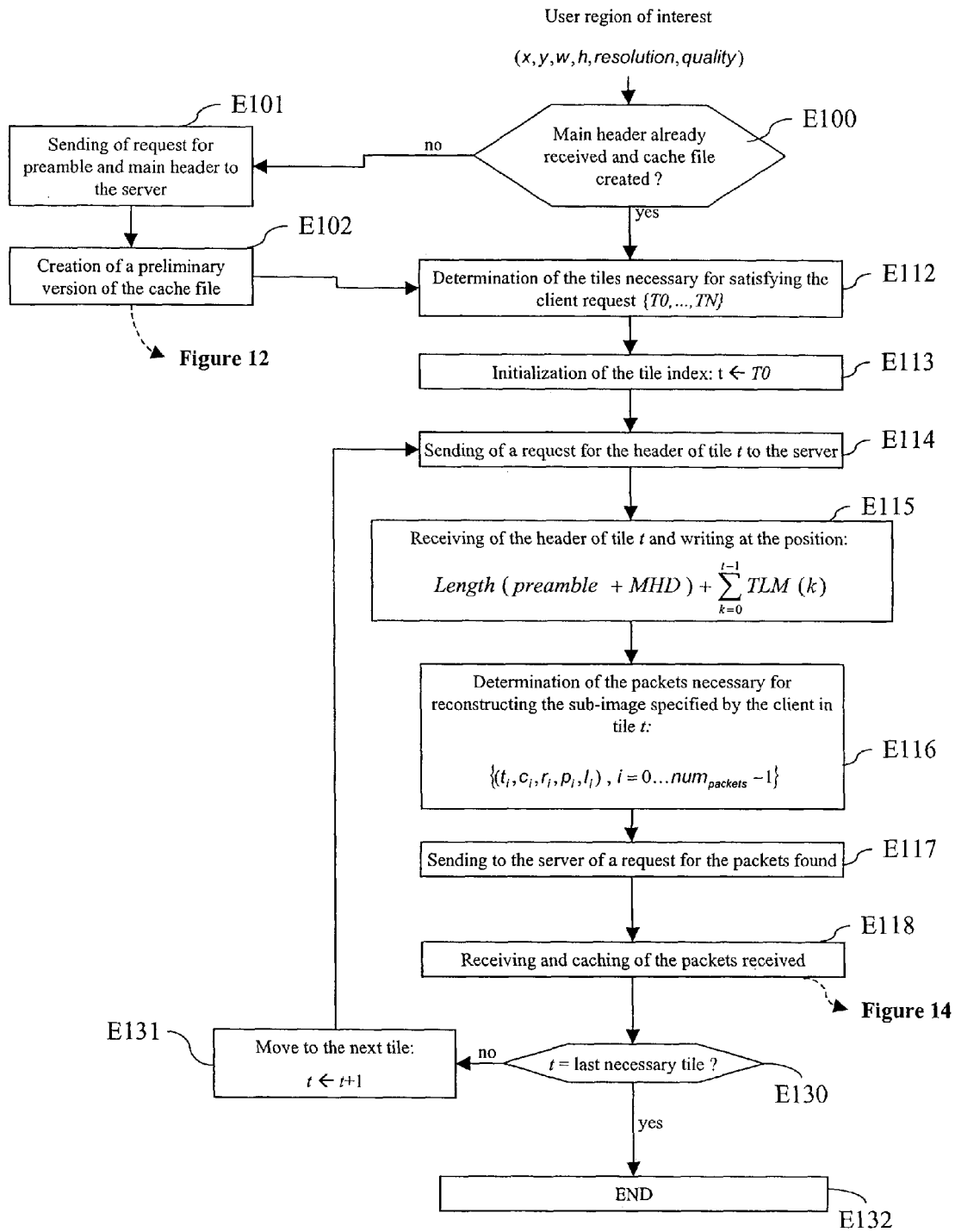
FIG. 11 is an algorithm implemented by the first communication apparatus (client machine) and which relates to the processing of data received by this apparatus.

The algorithm of FIG. 11 relates to the processing, by the first communication apparatus (client machine) depicted in FIG. 1, of data received by this apparatus, when the requests it transmitted to the second communication apparatus are requests aimed at obtaining one or more data packets of the signal.

The mode of operation of the first communication apparatus that is illustrated by the algorithm of FIG. 11 is complementary to the mode of operation of the second communication apparatus (first aspect of the invention) presented during the description of the algorithms of FIGS. 7 to 9.

This algorithm and the following ones illustrate the second aspect of the invention.

The algorithm of FIG. 11 comprises different instructions or portions of code corresponding to steps of the method of processing data received by the first communication apparatus according to the invention.

Where the communication apparatus depicted in FIG. 2 corresponds to the first communication apparatus (client machine) of FIG. 1, then the computer program "Progr" stored in the apparatus of FIG. 2 is based on the algorithm of FIG. 11, and the following algorithms.

It should be noted that the algorithm of FIG. 11 illustrates the operations performed by the first communication apparatus and the links between these operations in order to download the compressed data necessary for reconstructing the signal part required by the user, and in order to store these in a file referred to as a cache file.

The algorithm of FIG. 11 starts with a first step E100 during which a test is carried out in order to determine whether the main header data of the signal stored in the second communication apparatus have already been received by the first apparatus and whether the cache file has already been created.

If the answer is no, the step E100 is followed by a step E101 during which the first communication apparatus transmits to the second apparatus a request aimed at obtaining the main header data (including the preamble) of the image signal.

This step is followed by a step E102 during which provision is made to create a derived compressed digital signal from the compressed digital signal present in the second apparatus in the form of a cache file.

Figure 12:
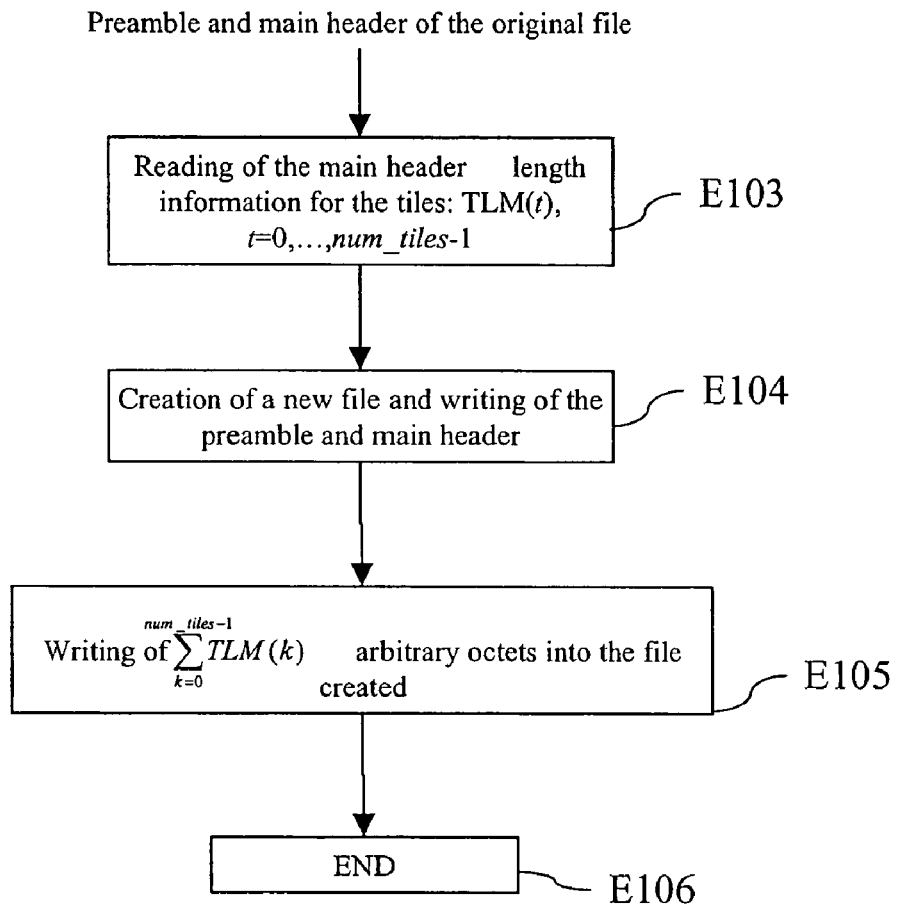
FIG. 12 is an algorithm detailing the operations performed at step E102 of the algorithm of FIG. 11.

The operations performed during this step 102 are illustrated in FIG. 12 that depicts the algorithm for creating a preliminary version of the cache file.

This algorithm, that also forms part of the algorithm of FIG. 11, starts with a first step E103 during which the main header data received from the second communication apparatus are read.

This makes it possible to obtain at least one pointer marker adapted to provide the length of the body of the original compressed digital signal.

More particularly, this information is provided by the lengths of the tiles TLM (k) where k=0, . . . num_tiles−1, this information being contained in the TLM pointer marker of the main header data.

During the following step E104, provision is made to form a derived compressed digital signal from the received header data and which thus comprises, as header data, the header data that have just been received.

More particularly, these header data consisting of the preamble and the main header data are written into a new file that will constitute the cache file already mentioned.

The algorithm of FIG. 12 next comprises a step E105 during which provision is made to fill the body of the derived signal with arbitrary data, so as to constitute a space of the same size as the body of the original signal present in the second communication apparatus.

The body of the derived signal will thus be capable of receiving all or part of the body of the original compressed digital signal present in the second apparatus, namely the region or tile header data and the packets that will be transmitted during the communication session.

More particularly, there is carried out, during the step E105, the writing into tiles 0 to num_tiles−1 of a number of arbitrary octets equal to the sum $$\sum_{k=0}^{num\_tiles-1} TLM(k).$$

The algorithm of FIG. 12 is next terminated by the step E106.

Figure 13:
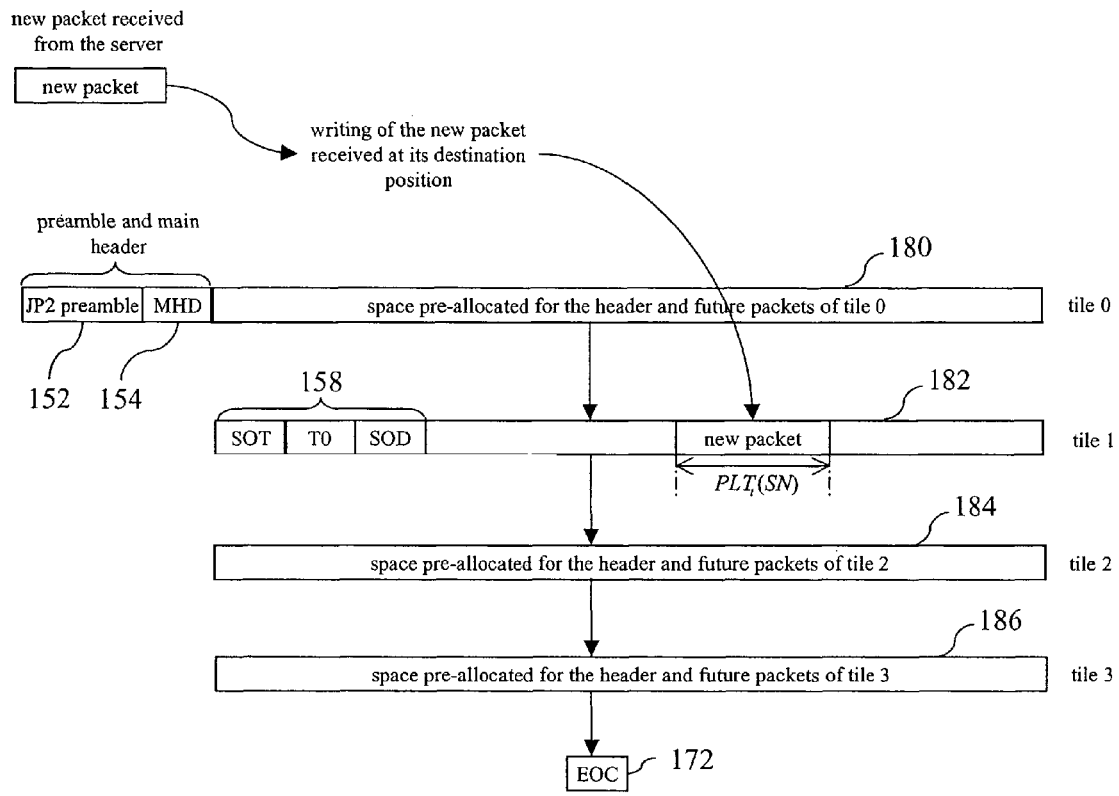
FIG. 13 is a schematic representation of the structure of a derived signal formed in the first communication apparatus according to the invention.

FIG. 13 illustrates the structure of the derived signal formed in the first communication apparatus and stored in the cache file.

As depicted in this figure, the header data of the derived signal consist of the preamble and the main header data respectively denoted 152 and 154, the data corresponding to the header data having the same references in FIG. 6.

FIG. 13 also shows, in the body of the derived signal, the space filled with arbitrary data and which is reserved for the tile header data and the data constituting the tile bodies intended to be received from the second communication apparatus.

It should thus be noted that the space 180 is reserved for receiving the data of tile 0, the space 182 for receiving the data of tile 1, the space 184 for the data of tile 2 and the space 186 for the data of tile 3.

The end-of-signal marker 172 of FIG. 6 is also shown at the end of the derived signal in FIG. 13.

Returning to the algorithm of FIG. 11, the situation is considered where the user has sent a request with a view to obtaining part of the signal in the form, for example, of a position and dimension of a sub-image of this signal, as well as the desired resolution level and quality level.

It should be noted that this request from the user is interpreted by the first communication apparatus (client machine) that then identifies the data of the signal corresponding to this request. The apparatus next formulates a request specifying the required data, sent to the second communication apparatus.

It should however be noted that the case where the request transmitted by the first communication apparatus directly referred to part of this signal (position, dimension, etc.) was dealt with during the description given with reference to the algorithm of FIG. 10.

The operation of the first communication apparatus sending such a request will be described later with reference to FIG. 15.

For the moment, within the context of the algorithm of FIG. 11, the first communication apparatus interprets the request of the user specifying part of the signal and proceeds as follows.

During a step E112, provision is made to determine the set of tiles or regions of the signal that are concerned by the signal part required by the user and that are therefore necessary for satisfying the request.

This set of tiles is denoted T0, . . . TN.

During the following step E113, the tile index t is initialized to the value T0.

The step E113 is followed by a step E114 of transmitting to the second communication apparatus a request aimed at obtaining the header data of the tile t under consideration.

In the normal course of operations, between this step and the following step E115, the second communication apparatus depicted in FIG. 1 executes the algorithms of FIGS. 7 and 8 in order to process the request received from the first communication apparatus.

During the step E115, the first communication apparatus receives the tile header data requested previously and inserts them into the body of the derived signal, at the destination position determined during the step E113.

It should be noted that, in order to implement this step of determining the destination position of the header data of the tile t under consideration, the following expression is called upon:

$$\text{Length}(\text{preamble} + MHD) + \sum_{k=0}^{t-1} TLM(k),$$

where TLM(k) represents the length of tile k.

Use is thus advantageously made of the information contained in the TLM pointer marker which were obtained from reading the main header data (step E103 of FIG. 12).

During the step E116, the packets necessary for reconstructing the part of the signal specified by the client for the tile t under consideration are determined.

Once these packets have been identified, the following step E117 transmits to the second communication apparatus (server) a request aimed at obtaining the identified packets that correspond to the request of the user.

It should be noted that, between this step E117 and the following step E118, the algorithms of FIGS. 7 and 9 are implemented by the second communication apparatus receiving the request in order to process it, that is to say determine the position of the packets identified in the request, extract them from the signal and transmit them to the first communication apparatus.

During the step E118, the first communication apparatus receives and stores in an adapted manner the packets thus received.

Figure 14:
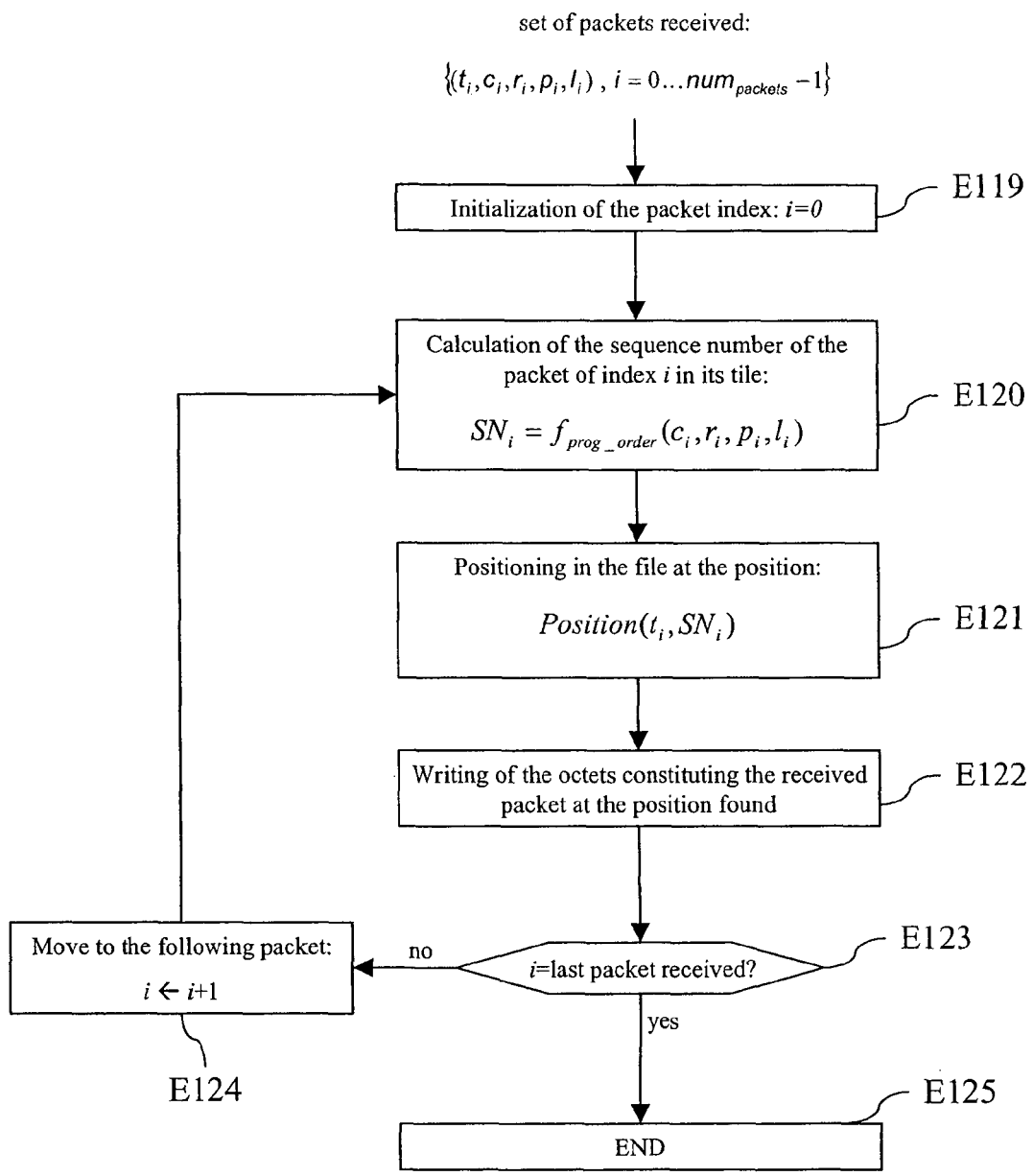
FIG. 14 is an algorithm detailing the operations performed at step E118 of the algorithm of FIG. 11.

The algorithm of FIG. 14 details the operations performed at the step E118 of FIG. 11 and also forms part of this algorithm.

The algorithm of FIG. 14 comprises different instructions or portions of code corresponding to steps of the method of processing received data according to the invention.

This algorithm starts with a step E119 of initializing the packet index i to the value 0, in order to process first of all the first packet in the set of received packets.

During the following step E120, the order of appearance of the data packet under consideration in the body of the signal is determined, according to parameters relating to the structure and organization of the data in the signal.

This is performed more particularly according to the header data of the signal and this step is identical to the step E71 of FIG. 9 and will therefore not be dealt with any further here.

As soon as the order of appearance of the packet in the body of the signal, namely its sequence number $SN_i$, has been determined, then the step E120 is followed by a step E121.

During this step, the position is determined at which the packet under consideration must be inserted into the body of the derived signal according, on the one hand, to the length of the header data and, on the other hand, to at least one pointer marker that has previously been received in the header data and that is adapted to provide the length of the part of the body preceding this data packet.

To do this, the procedure is identical to that described with reference to the step E72 of FIG. 9.

Thus, the length of the part of the body of the signal preceding the data packet under consideration here is determined from the TLM pointer marker, part of which provides the length of the tile or tiles preceding the one where the packet under consideration is located.

Thus, for example, as illustrated in FIG. 13, if the packet under consideration has to be inserted into tile 1, then the information of interest is that provided by the TLM pointer marker that gives the length of tile 0.

Furthermore, the length of the part of the body of the signal preceding the data packet under consideration is also determined from the length of the header data of the tile where this packet is located, namely, in the example of FIG. 13, the header data 158 of tile 1.

The length of the part of the body of the signal preceding the packet under consideration is, moreover, determined from values contained in the PLT pointer marker that is adapted to provide the length of the data packets preceding the packet under consideration in the tile where it is located, namely tile 1.

Thus, once the position of the packet under consideration in the derived signal (stored in the cache file) has been determined, the procedure goes to the following step E122 during which this packet is inserted, into the body of the derived signal, at the position determined at the preceding step.

The new packet of length PLTT(SN) is thus inserted into the body of tile 1 by writing, into the cache file, the octets constituting this packet (FIG. 13).

It should be noted that this writing operation leads to overwriting part of the space initially filled with arbitrary data and that were intended to receive data coming from the second communication apparatus.

During the following step E123, provision is made to perform a test in order to determine whether the packet that has just been processed is the last packet received.

If the answer is no, this step is followed by a step E124 during which the packet index is incremented by one unit in order to be concerned with the next packet in the set of received packets, and this step is then followed by the step E120 already described above.

On the contrary, when the result of the test carried out at the step E123 is positive, then the algorithm of FIG. 14 is terminated by a step E125.

As soon as the algorithm of FIG. 14 has been executed, the step E118 of FIG. 11 is followed by a step E130, during which a test is carried out in order to determine whether the current tile t that has just been processed corresponds to the last tile necessary for satisfying the request of the user.

If the answer is no, this step is followed by a step E131 during which the tile index is incremented by one unit, in order to be concerned with the next necessary tile determined at the step E112.

The step E131 is next followed by the step E114 already described above.

In this case, the step E114 makes provision to transmit to the second communication apparatus a new request aimed at obtaining the header data of the new tile in the course of being processed.

On the contrary, when the result of the test carried out at the step E130 is positive, then the algorithm of FIG. 11 is terminated by a step E132.

It should be noted that the algorithm of FIG. 11 makes provision to process the packets received by the first communication apparatus in the same progression order as that of the codestream of the image signal stored in the second communication apparatus.

Consequently, if all the packets of the image signal stored in the second communication apparatus are transferred to the first apparatus, then the derived signal is identical to the original signal.

However, it is possible to make provision for a different organization of the data in the derived signal according, for example, to the requirements of the user.

Figure 15:
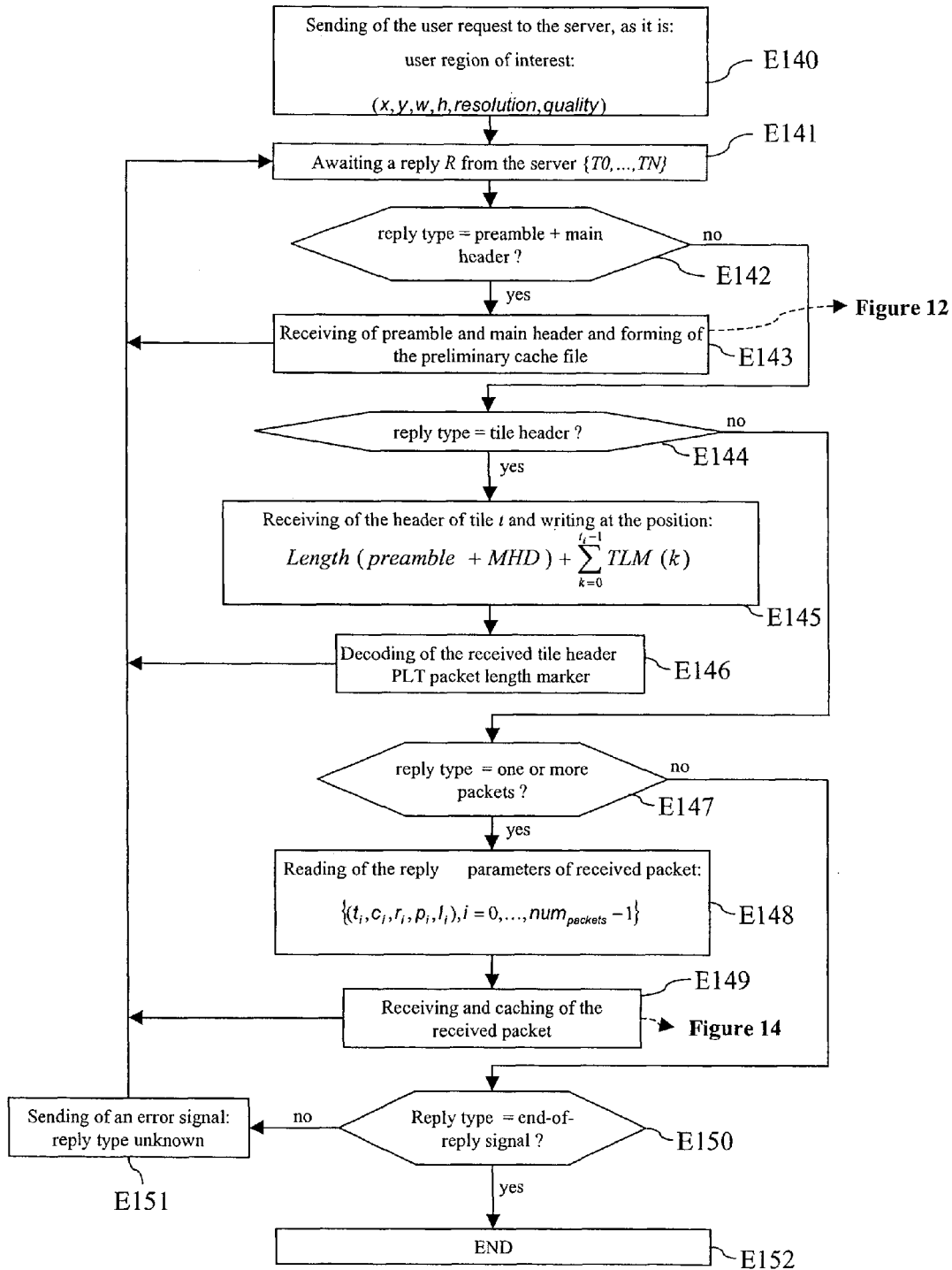
FIG. 15 is an algorithm illustrating a variant embodiment of the algorithm of FIG. 11 that relates to the processing, by the first communication apparatus (client machine), of a request aimed at obtaining a region of interest desired by the user, and the reply to this request.

The algorithm of FIG. 15 illustrates a variant embodiment that complements the one described with reference to FIG. 9. This variant relates to the case where the first communication apparatus transmits to the second communication apparatus a request aimed at directly obtaining part of the signal present in this second apparatus.

As already indicated above, this part of the signal is for example specified in the request by the size and position of the desired part of the signal, as well as the desired resolution and quality levels.

The algorithm of FIG. 15 is implemented by the first communication apparatus and comprises different instructions or portions of code corresponding to steps of the method of processing data received by this apparatus.

This algorithm starts with a step E140 of transmitting the aforementioned request from the first apparatus to the second apparatus.

This step is followed by a step E141 during which the first apparatus awaits a reply R coming from the second apparatus.

When the reply R is received by the first apparatus, then the procedure goes to the following step E142, during which a test is carried out in order to determine whether the reply contains the main header data of the signal stored in the second communication apparatus, namely the preamble and the main header.

In the affirmative, this step is followed by a step E143 during which the derived signal and, more particularly, a cache file, are formed.

The algorithm of FIG. 12 is thus called upon to implement the step E143.

It should be noted that the step E143 is identical to the step E102 described in more detail with reference to FIG. 12 and will therefore not be detailed any further here.

The step E143 is then followed by the step E141 described previously, during which the first communication apparatus awaits a reply from the second communication apparatus.

Returning to the step E142, when the result of the test carried out at this step is negative, then the procedure goes to the following step E144 during which another test is carried out in order to determine whether the reply relates to tile header data.

In the affirmative, the step is followed by a step E145 during which the header data of the tile t under consideration are received and inserted at the position determined by the following expression:

$$\text{Length}(\text{preamble} + MHD) + \sum_{k=0}^{t-1} TLM(k),$$

where TLM(k) represents the length of tile k.

This step is identical to the step E115 of the algorithm of FIG. 11 and will therefore not be detailed any further here.

The tile header data having thus been stored in the cache file at the appropriate position, the step E145 is followed by a step E146 during which the tile header data are read, in order to extract therefrom the length information of the packets contained in this tile from the PLT pointer marker present in these header data.

The step E146 is next followed by the step E141 of awaiting a reply coming from the second communication apparatus and which has already been described above.

Returning to the step E144, when the result of the test carried out at this step is negative, then it is followed by a step E147 during which another test is carried out in order to determine whether the reply coming from the second communication apparatus comprises one or more data packets.

In the affirmative, this step is followed by the step E148 during which provision is made to identify the received data packets and their parameters $t_i$, $c_i$, $r_i$, $p_i$, $l_i$, with i=0 to $\text{num}_{packets}-1$.

This step is followed by a step E149 that is identical to the step E118 of the algorithm of FIG. 11 and, like it, calls upon the algorithm of FIG. 14 for its execution.

During this step, provision is thus made, on the one hand, for determining the position at which the different packets received in the reply must be inserted into the body of the derived signal and, on the other hand, for storing them therein.

The step E149 is next followed by the step E141 already described above.

Returning to the step E147, when the result of the test carried out at this step is negative, then it is followed by a step E150 during which another test is carried out in order to determine whether the received reply corresponds to an end-of-reply signal.

If the answer is no, then the step E150 is followed by a step E151 during which an error signal is transmitted to the second communication apparatus, in order to inform it that the reply just received by the first apparatus is of unknown type.

This step is next followed by the step E141 already described above.

On the contrary, when the result of the test carried out at the step E150 is positive, then the algorithm of FIG. 15 is terminated by a step E152.

It should be noted that it is advantageous to store in memory the derived signal in the cache file since, from one communication session to another, it is possible to continue to receive data packets relating to this same signal.

Figure 16:
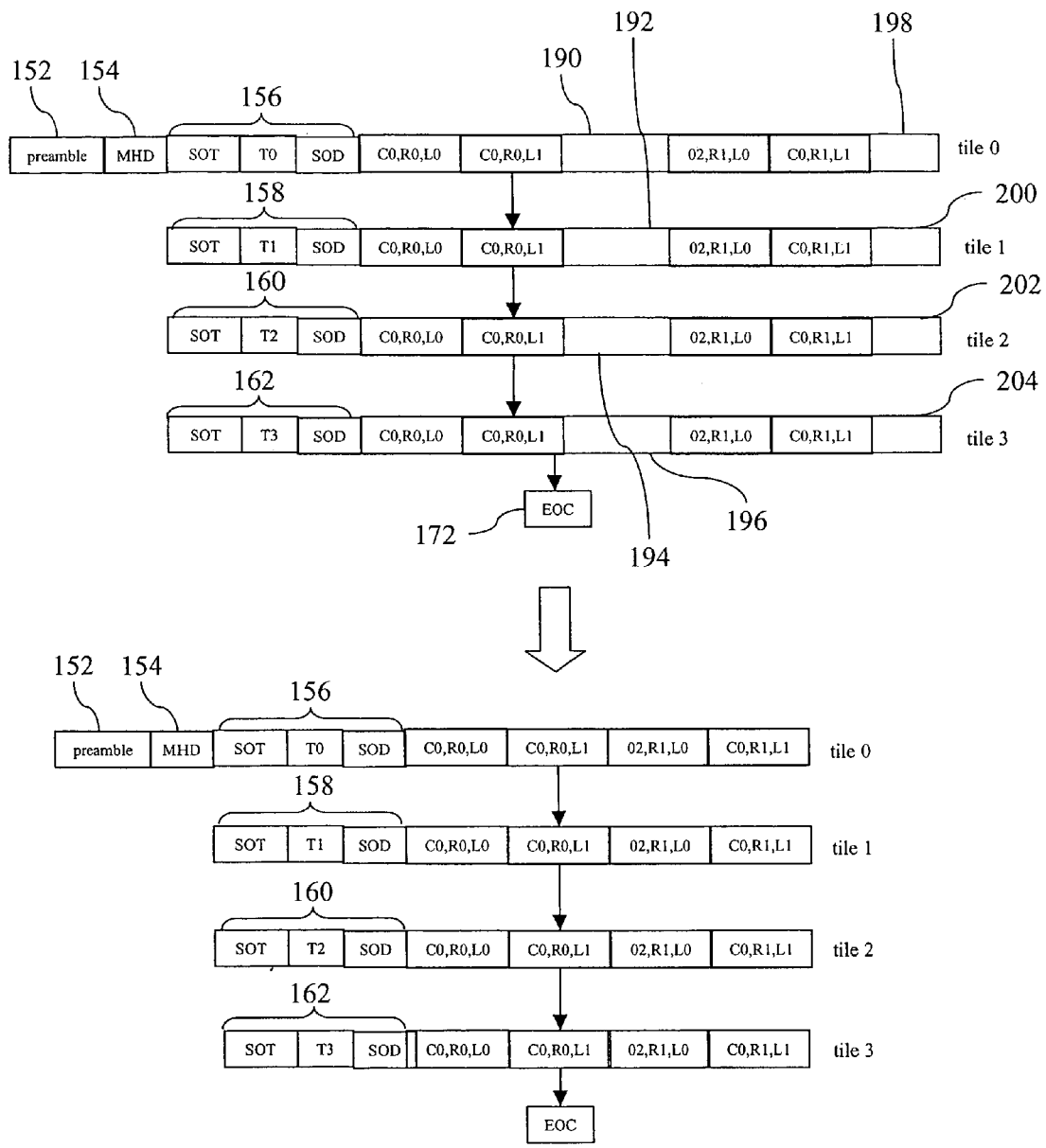
FIG. 16 is a schematic representation of a derived signal formed in the first communication apparatus and of the valid signal resulting therefrom.

FIG. 16 illustrates an example of a derived signal formed from the header data 150 of the original signal, the structure of which is depicted in FIG. 6, and certain data packets contained in the body of this signal.

Thus, by implementing the mechanisms previously explained for determining the position of the received packets coming from the second communication apparatus and for inserting these packets at the determined position in the signal, there is obtained, for example, the structure depicted in the upper part of FIG. 16.

As depicted in this structure, the cache file containing the derived signal thus formed comprises, in the space initially filled with arbitrary data and which was intended to contain the packets received from the second apparatus, all the data packets received from this second apparatus, as well as sub-spaces still filled with arbitrary data and for which no packet has been received.

These sub-spaces are referenced 190, 192, 194, 196, 198, 200, 202 and 204 in FIG. 16.

Thus, the derived signal that has just been formed can be kept as it is in the cache memory of the first communication apparatus, in order to be able to be used, during future communication sessions, to receive other data packets relating to this same signal.

However, it can also be advantageous to convert this derived signal into a signal referred to as a valid signal and which is valid in the sense that it conforms to the description syntax provided for in the JPEG2000 standard.

This of course is valid only in the case where the invention is applicable to image signals that conform to the JPEG2000 standard.

In the case of a signal that is not necessarily an image signal, it can also be decided to convert the derived signal formed according to the invention in order to make it conform to the standard to which the original signal present in the second apparatus conforms.

The lower part of FIG. 16 depicts the structure of the valid signal resulting from the aforementioned conversion.

The signal thus converted then contains as many tiles, components, resolution levels and quality layers as the original signal present in the second communication apparatus.

It should be noted that all the header data as well as the different data packets received and inserted into the derived signal depicted in the upper part of FIG. 16 have been extracted from this signal, the header data having been used to form the header data of the valid signal.

As regards the extracted data packets, these have been concatenated in the body of the valid signal.

Where data packets have not been received, there have been concatenated following the other packets, in the valid signal, empty packets in the same order of appearance as that adopted in the derived signal.

It should be noted that the empty packets each have a length equal at most to one octet.

The main header data and the tile header data are thus slightly modified in order to take account of the reduction in length of each tile due to the insertion of empty packets.

The creation of such empty packets in the valid signal constitutes a simple means of constructing a valid signal in the sense of the JPEG2000 standard.

Advantageously, such a valid signal makes it possible to subsequently use the set of data obtained during the communication session between the first communication apparatus and the second communication apparatus, by means of a decoder conforming to the JPEG2000 standard and which is independent of the client/server architecture used.

There will now be described in more detail the algorithm for converting the derived signal into a valid signal with reference to FIG. 17.

This algorithm comprises different instructions or portions of code corresponding to steps of the method of processing data received by the first communication apparatus according to the invention.

It should be noted that the computer program "Progr" stored in the communication apparatus depicted in FIG. 2 and which corresponds here to the first communication apparatus according to the invention is also based on this algorithm.

Figure 17:
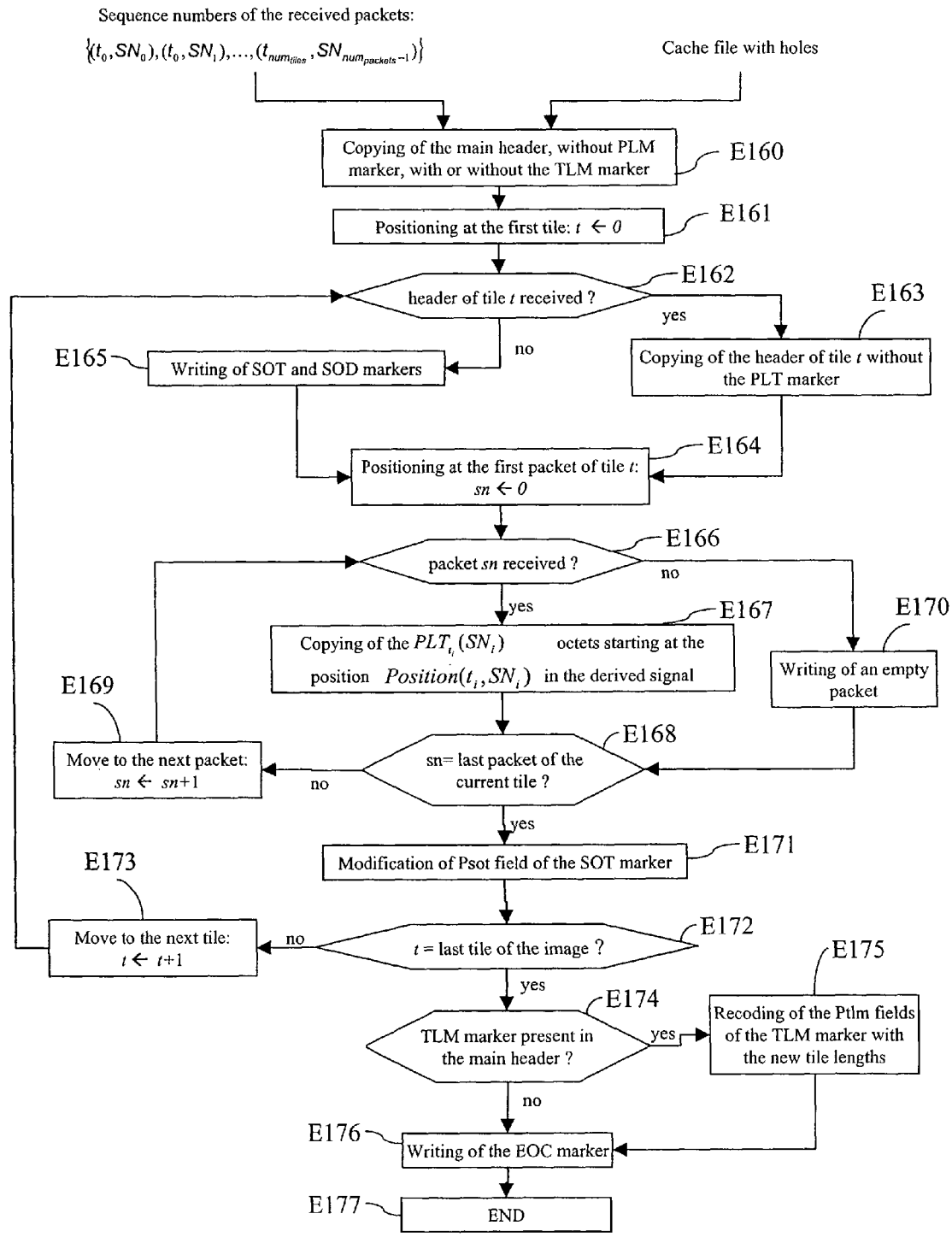
FIG. 17 is an algorithm for converting the derived signal into a valid signal.

The algorithm of FIG. 17 starts with a step E160 during which the main header data 152 and 154 (FIG. 16) are extracted from the derived signal and copied into a new so-called valid file.

It should be noted that the header data of the valid signal are thus formed from the header data extracted from the derived signal.

It should also be noted that, during this step, the main header data are somewhat modified in order to simplify the algorithm.

In fact, if a PLM pointer marker providing the lengths of the packets of each of the tiles in the signal is present in the main header data, then it is not reproduced in the valid signal.

This makes it possible to avoid having to modify this marker subsequently, when concatenating empty packets in the valid signal.

It should be noted, furthermore, that the TLM pointer marker present in the main header data can be kept or not in the main header data of the valid signal.

In fact, keeping this marker will necessitate modifying it towards the end of the algorithm, but this keeping is justified inasmuch as the envisaged modification is not very complex to implement.

The following step E161 makes provision to set the position to the first tile 0 of the signal, this then providing the value of the current tile index t.

All the tiles of the signal will thus be gone through one by one.

This step E161 is followed by a step E162 during which a test is carried out in order to determine whether the header data of the tile t concerned have been received by the first communication apparatus.

In the affirmative, the step is followed by a step E163 during which these tile header data are inserted into the valid signal that has just been started to be formed at the step E160, by copying these header data into the valid file containing this signal.

However, the PLT pointer marker contained in these tile header data is not kept for reasons identical to those mentioned above for the PLM marker.

The step E163 is next followed by a step E164 during which the position is set to the first data packet of the tile t under consideration, and the packet index sn is then initialized to the value 0 corresponding to this first packet.

Returning to the step E162, when the result of the test carried out at this test is negative, then the procedure goes to the following step E165, during which SOT and SOD markers are inserted into the valid signal, which amounts to inserting empty tile header data.

From the point of view of the JPEG2000 description syntax, this means that the body of the tile under consideration will contain as many packets as indicated by the main header data of the valid signal.

Inasmuch as no packet has been received in the tile under consideration, all the packets constituting the body of this tile will therefore be empty.

The step E165 is next followed by the step E164 described previously.

The step E164 is followed in its turn by a step E166, during which a test is carried out, in order to determine whether the packet with index sn has been received and inserted into the derived signal depicted in the upper part of FIG. 16.

In the affirmative, this step is followed by a step E167 during which the $PLT_{t_i}$ ($SN_i$) octets that start at the position "Position($t_i$, $SN_i$)" in the derived signal and correspond to the octets of the received packet sn are inserted into the body of this signal and, more particularly, concatenated with the other data constituting the other packets already present.

This step is next followed by a step E168 during which a test is carried out, in order to determine whether the packet index sn corresponds to the index of the last packet of the current tile.

If the answer is no, the procedure goes to the step E169 during which the packet index is incremented by one unit and this step is then followed by the step E166 described previously.

When the result of the test carried out at the step E166 is negative, then this means that the packet with index sn has not been received and the following step E170 makes provision to insert an empty packet into the body of the valid signal and, more particularly, to concatenate an empty packet following the packets already in place.

It should be noted that an empty packet is indicated by the first bit of its header which is equal to 0.

It should be noted that, if a bit at 0 is present in the signal in order to indicate an empty packet, then if necessary it is added to in order that the packet header ends at an octet boundary, as provided for by the JPEG2000 standard.

The step E170 is then followed by the step E168 already described above.

When the result of the test carried out at the step E168 is positive, this means that all the packets of the current tile have been concatenated in the valid signal.

The procedure then goes to the following step E171 during which the total length of the current tile is calculated and the Psot field of the SOT marker of the header data of the tile is modified in order to indicate the total length of this tile.

It should be noted that the coding of this field is known to persons skilled in the art and defined in Part I of the JPEG2000 standard for which the full references have been provided above.

The step E171 is next followed by a step E172 during which a test is carried out in order to determine whether the tile index t corresponds to the index of the last tile of the image signal under consideration.

If the answer is no, this step is followed by a step E173 which makes provision to increment the index of the tile by one unit and is then followed by the step E162 already described above.

If the answer is yes, the step E172 is followed by a step E174 during which a test is carried out in order to determine whether the TLM pointer marker is present in the main header data.

In the affirmative, the following step E175 makes provision to recode the different Ptlm fields (also denoted TLM (k), where k is the tile index) of this marker and which provide the respective lengths of the different tiles of the image signal.

It should be noted in passing that, to do this, it is necessary to have first stored the lengths of each tile in the valid signal in the process of being formed.

Here again, this recoding operation is also known to persons skilled in the art.

It should be noted that the recoding of the Ptlm fields of the TLM pointer marker does not involve any modification of the total length of this marker.

Thus, the recoding operation does not necessitate inserting or deleting octets in the valid signal in the process of being formed.

The step E175 is next followed by a step E176 that makes provision to write the marker 172 denoted EOC and indicating the end of the valid signal.

Returning to the step E174, when the result of the test carried out is negative, then the procedure goes directly to the step E176 that has just been described.

The algorithm is then terminated by a step E177.

Figure 18:
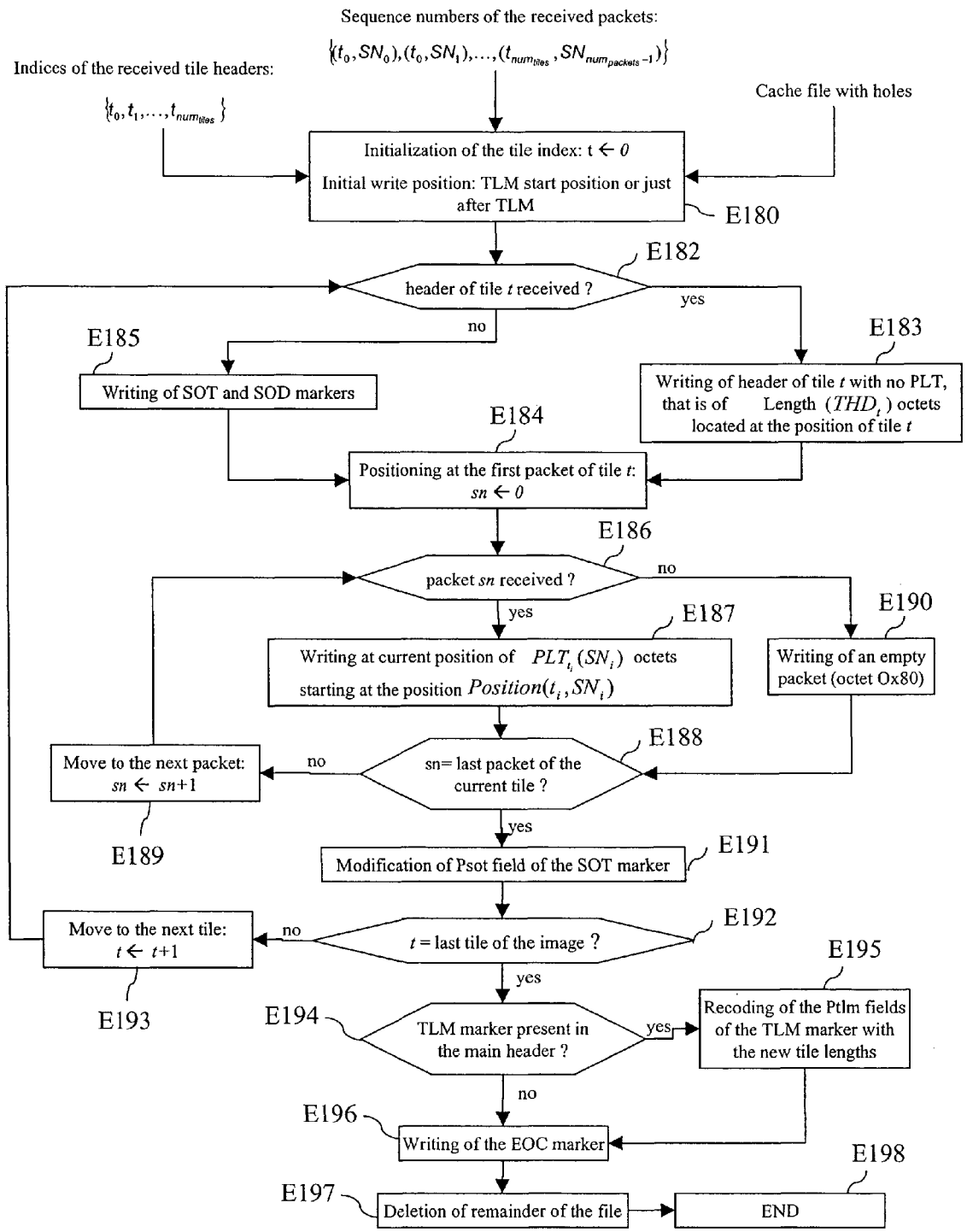
FIG. 18 depicts a variant embodiment of the algorithm of FIG. 17.

The algorithm of FIG. 18 proposes a variant embodiment of the conversion of the valid signal illustrated by the algorithm of FIG. 17.

Unlike the latter that forms a new codestream in a new file in order that said file is valid in the sense of the JPEG2000 standard, the mechanism proposed in FIG. 18 envisages converting the derived signal that is stored in the cache file, in order to make it conform to the JPEG2000 standard within this same file.

This algorithm comprises different instructions or portions of code corresponding to steps of the method according to the invention.

This algorithm starts with a step E180 during which the tile index t is initialized to the first tile 0.

During this step, the position in the derived signal is also set to the location where the conversions of the signal will be performed.

This initial position corresponds to the start of the TLM pointer marker in the case where it is wished for this marker to be kept in the valid version of the derived signal.

If on the other hand it is decided not to keep it, then the initial position is located just after the end of this marker.

The following step E182 makes provision to perform a test in order to determine whether the header data of the tile t under consideration have been received and are present in the derived signal.

In the affirmative, the procedure goes to the step E183 during which provision is made to write the tile header data, with the exception of the PLT marker, into the signal, at the current position corresponding, initially, to the position indicated at the step E180.

It should be noted that, for the first tile thus processed, the tile header data are already present at the correct position.

On the other hand, when the step E183 is executed for another tile and data packets have not been received in the preceding tile, then, effectively, it will be necessary to shift the data in an adapted manner and therefore rewrite these tile header data at the correct position.

The step E183 is next followed by a step E184 during which provision is made to set the position to the first packet of the tile t under consideration, the index of the first packet sn being initialized to the value 0.

Returning to the step E182, when the result of the test carried out at this step is negative, then the procedure goes to the step E185 that is identical to the step E165 of FIG. 17 and during which empty tile header data, that is to say a SOT marker and a SOD marker, are written into the signal.

The step E185 is next followed by the step E184 described previously.

The latter is followed by a step E186 during which a test is carried out in order to determine whether the packet with index sn has been received.

In the affirmative, this packet is written octet by octet at the current position under consideration pos (step E187).

This step is identical to the step E167 of the algorithm of FIG. 17.

It should be noted that, each time an octet is written into the signal, the current position pos is incremented by one unit.

The step E187 is next followed by a step E188 during which a test is carried out in order to determine whether the index sn of the packet corresponds to the index of the last packet of the current tile t under consideration.

If the answer is no, this step is followed by the step E189 that increments this index by one unit in order to move to the following packet and is followed by the step E186 described previously.

When the result of the test carried out at the step E186 is negative, this means that the packet with index sn has not been received and an empty packet is then written into the signal during the following step E190.

It should be noted that more particularly the octet 0x80 in hexadecimal notation is written.

The step E190 is next followed by the step E188 described previously.

As already described with reference to FIG. 17, the following steps E191, E192, E193, E194, E195 and E196 consist of updating the TLM pointer marker, if it has been kept in the valid version of the derived signal, and of writing the end-of-signal marker EOC.

The steps that have just been cited correspond respectively to the steps E171, E172, E173, E174, E175 and E176 of the algorithm of FIG. 17 and will therefore not be described any further here.

On the other hand, the algorithm of FIG. 18 comprises, following upon the step E196, a step E197 during which provision is made to delete the remaining octets of the signal that has just been converted as indicated during the preceding steps.

This is because the length of the derived signal that was initially formed is greater than that of the valid signal thus formed.

The algorithm of FIG. 18 is next terminated by the step E198.

It should be noted that the writing of an octet in the algorithm of FIG. 18 consists of overwriting the octet already present at the same position in the signal in the process of being formed.

Furthermore, in the majority of cases, the proposed algorithm avoids having to store data of the derived signal to be converted with the aim of not overwriting useful data that have been received.

The invention claimed is:

1. A method of processing a request from a first communication apparatus connected through a communication network to a remote second communication apparatus, the method being implemented in the second apparatus, the method comprising the steps of:
receiving the request, wherein the request is for obtaining digital data of a compressed digital signal that comprises header data and a signal body comprising data packets;
determining whether or not at least one pointer marker, providing information for calculating the length of the part of the signal body preceding at least one data packet corresponding to the request, is absent in the header data via a test;
forming the at least one pointer marker in the compressed digital signal when the determining step determines that the at least one pointer marker providing information for calculating the length of the part of the signal body, is not present in the header data; and
processing the request including the step of determining a position, in the body of the compressed digital signal, of the at least one data packet corresponding to the request as a function of the length of the header data and of the at least one pointer marker present in the header data of the compressed digital signal.

2. The method according to claim 1, further comprising the step of determining the length of the part of the body of the compressed digital signal preceding the data packet under consideration comprising a preliminary step of determining the order of appearance of the data packet in the body of the compressed digital signal, according to parameters relating to structure and organization of the data in the compressed digital signal.

3. The method according to claim 1, wherein the compressed digital signal is partitioned into a number n of independently compressed regions $t_i$ =1 to n and n ≧ 1, the body of the compressed digital signal comprising, for each region, region header data and a region body containing data packets of the region under consideration.

4. The method according to claim 3, wherein the length of the part of the body of the compressed digital signal preceding the data packet under consideration is determined from:
at least one pointer marker PLT providing information for calculating the length of the data packet or packets preceding the data packet under consideration in the region where this packet is located,
the length of the header data of the region where the packet under consideration is located and, when one or more regions precede the region where the packet under consideration is located,
at least one pointer marker TLM providing information for calculating the length of the preceding region or regions.

5. The method according to claim 4, wherein a pointer marker TLM providing information for calculating the length of each region t, is present in the header data.

6. The method according to claim 4, wherein a pointer marker PLT providing information for calculating the length of the data packets in a region $t_i$, is present in the header data of the region concerned.

7. The method according to claim 1, further comprising the steps of extracting and transmitting to the first communication apparatus the at least one data packet having a position that has been determined.

8. The method according to claim 1, wherein the request for obtaining digital data specifies at least one data packet of the compressed digital signal.

9. The method according to claim 1, wherein the request for obtaining digital data specifies part of the compressed digital signal.

10. The method according to claim 9, wherein, subsequent to the request being received, the method comprises a step of identifying the data packet or packets necessary for the reconstruction of the specified part of the compressed digital signal.

11. A method of processing compressed digital data received by a first communication apparatus connected through a communication network to a remote second communication apparatus, the method being implemented in the first communication apparatus, the method comprising the steps of:
receiving only a portion of a compressed digital signal present in the second apparatus and comprising a body that comprises data packets, the received portion of the compressed digital signal comprising at least one data packet;
generating a derived compressed digital signal derived from the compressed digital signal present in the second apparatus in the form of a cache file, the derived compressed digital signal comprising header data and a body and capable of containing all or part of the body of the compressed digital signal present in the second apparatus;

filling the body of the derived compressed digital signal in the cache file with arbitrary data, so as to constitute a space of the same size as the body of the compressed digital signal present in the second apparatus;

determining a position at which the at least one data packet of the received portion of the compressed digital signal is to be inserted into the body of the derived compressed digital signal, the position being determined as a function of the length of the header data and of at least one pointer marker previously received and inserted into the header data of the derived compressed digital signal by the first apparatus, the at least one pointer marker providing information for calculating the length of the part of the body of the derived compressed digital signal preceding the at least one data packet of the received portion of the compressed digital signal;

inserting into the body of the derived compressed digital signal the at least one data packet of the received portion of the compressed digital signal at the determined position; and a phase of converting the derived compressed digital signal into a valid signal comprising the steps of:
extracting from the derived compressed digital signal the header data and received data packets;
forming the header data of the valid signal from the header data extracted from the derived compressed digital signal;
concatenating the data packets extracted from the derived compressed digital signal in the body of the valid signal; and
when one or more data packets present in the body of an original compressed digital signal in the second apparatus, from which the derived compressed digital signal is derived, are not received by the first apparatus, concatenating respectively one or more empty packets in the body of the valid signal in the same order of appearance as that adopted in the derived compressed digital signal.

12. The method according to claim 11, wherein the compressed digital signal present in the second apparatus is an original compressed digital signal, said method further comprising the preliminary steps of:
receiving the header data from the original compressed digital signal present in the second apparatus, the received header data comprising at least one pointer marker TLM providing information for calculating the length of the body of the original compressed digital signal; and
forming, from the received header data, the derived compressed digital signal which thus comprises, as header data, the received header data and a signal body of length equal to that of the body of the original compressed digital signal, the body of the derived compressed digital signal representing a space initially filled with the arbitrary data and later containing the at least one data packet received from the second apparatus.

13. The method according to claim 11, wherein the derived compressed digital signal is partitioned into a number n of independently compressed regions $t_i$, i =1 to n and n≧1, the body of the signal of the derived compressed digital signal comprising, for each region, region header data and a region body containing data packets of the region under consideration.

14. The method according to claim 13, wherein the length of the part of the body of the derived compressed, digital signal preceding the data packet under consideration is determined from:
at least one pointer marker PLT providing information for calculating the length of the data packet or packets preceding the data packet under consideration in the region where this packet is located,
the length of the header data of the region where the packet under consideration is located, and,
when one or more regions precede the region where the packet under consideration is located, at least one pointer marker TLM provides information for calculating the length of the preceding region or regions.

15. The method according to claim 14, wherein a pointer marker providing information for calculating the length of each region t is present in the header data of the derived compressed digital signal.

16. The method according to claim 14, wherein a pointer marker providing information for calculating the length of the data packets in a region t, is present in the header data of the region under consideration.

17. The method according to claim 13, further comprising the steps of:
receiving region header data;
determining a position at which the received region header data is to be inserted into the body of the derived compressed digital signal, the position being determined according to the length of the header data of the derived compressed digital signal and, when one or more regions of the derived compressed digital signal precede the region header data according to one or more pointer markers TLM received previously, said method provides respectively the length of the preceding region or regions; and
inserting the received region header data at the determined position.

18. The method according to claim 11, further comprising the step of determining the length of the part of the body of the derived compressed digital signal preceding the at least one data packet comprising a preliminary step of determining the order of appearance of the at least one data packet in the body of the derived compressed digital signal according to parameters relating to structure and organization of the data in the derived compressed digital signal.

19. The method according to claim 12, further comprising a phase of converting the derived compressed digital signal into a valid signal comprising the steps of:
extracting from the derived compressed digital signal the header data and received data packets;
forming the header data of the valid signal from the header data extracted from the derived compressed digital signal;
concatenating the data packets extracted from the derived compressed digital signal in the body of the valid signal; and
when one or more data packets present in the body of the original compressed digital signal are not received by the first apparatus, concatenating respectively one or more empty packets in the body of the valid signal in the same order of appearance as that adopted in the derived compressed digital signal.

20. The method according to claim 12, further comprising the steps of:
going through the data contained in the body of the derived compressed digital signal;

converting, when the data gone through does not correspond to a data packet received from the second apparatus, the space filled by the data concerned into an empty packet; and shifting in an adapted manner the data comprising the remainder of the body of the derived compressed digital signal.

21. The method according to claim 11, wherein the data received by the first apparatus comprises the reply to a request previously transmitted from the first apparatus to the second apparatus.

22. A device for processing a request coming from a first communication apparatus connected through a communication network to a remote second communication apparatus, the device being implemented in the second apparatus, the device comprising:
   a receiver that receives the request, wherein the request is for obtaining digital data of a compressed digital signal that comprises header data and a signal body comprising data packets;
   a determining device that determines whether or not at least one pointer marker, providing information for calculating the length of the part of the signal body preceding at least one data packet corresponding to the request, is absent in the header data via a test;
   a forming device that forms the at least one pointer marker in the compressed digital signal when the determining device determines that the at least one pointer marker providing information for calculating the length of the part of the signal body, is not present in the header data; and
   a processor that processes the request and determines a position, in the body of the compressed digital signal, of the at least one data packet corresponding to the request as a function of the length of the header data and of the at least one pointer marker present in the header data of the compressed digital signal.

23. The device according to claim 22, further comprising a length determining device that determines the length of the part of the body of the compressed digital signal preceding the data packet under consideration and determines the order of appearance of the data packet in the body of the compressed digital signal according to parameters relating to structure and organization of the data in the compressed digital signal.

24. The device according to claim 22, wherein the compressed digital signal is partitioned into a number n of independently compressed regions $t_i$, i =1 to n and n≧1, the body of the compressed digital signal comprising, for each region, region header data and a region body containing data packets of the region under consideration.

25. The device according to claim 24, wherein the length of the part of the body of the compressed digital signal preceding the data packet under consideration is determined from:
   at least one pointer marker PLT providing information for calculating the length of the data packet or packets preceding the data packet under consideration in the region where this packet is located,
   the length of the header data of the region where the packet under consideration is located,
   and, when one or more regions precede the region where the packet under consideration is located, at least one pointer marker TLM providing information for calculating the length of the preceding region or regions.

26. The device according to claim 22, further comprising an extractor that extracts and transmits to the first communication apparatus the at least one data packet having a position that has been determined.

27. A device for processing compressed digital data received by a first communication apparatus connected through a communication network to a remote second communication apparatus, the device being implemented in the first communication apparatus, the device comprising:
   a receiver that receives only a portion of a compressed digital signal present in the second apparatus and comprising a body that comprises data packets, the received portion of the compressed digital signal comprising at least one data packet;
   a generating device that generates a derived compressed digital signal derived from the compressed digital signal present in the second apparatus in the form of a cache file, the derived compressed digital signal comprising header data and a body and capable of containing all or part of the body of the compressed digital signal present in the second apparatus;
   a filling device that fills the body of the derived compressed digital signal in the cache file with arbitrary data, so as to constitute a space of the same size as the body of the compressed digital signal present in the second apparatus;
   a processor that determines a position at which the at least one data packet of the received portion of the compressed digital signal is to be inserted into the body of the derived compressed digital signal, the position being determined as a function of the length of the header data and of at least one pointer marker previously received and inserted into the header data of the derived compressed digital signal by the first apparatus, the at least one pointer marker providing information for calculating the length of the part of the body of the derived compressed digital signal preceding the at least one data packet of the received portion of the compressed digital signal;
   an inserting device that inserts, into the body of the derived compressed digital signal, the at least one data packet of the received portion of the compressed digital signal at the determined position; and
   a converter that converts the derived compressed digital signal into a valid signal which comprises:
      an extractor that extracts from the derived compressed digital signal header data and received data packets;
      a forming device that forms the header data of the valid signal from the header data extracted from the derived compressed digital signal; and
      a concatenating device that concatenates the data packets extracted from the derived compressed digital signal in the body of the valid signal and, when one or more data packets present in the body of an original compressed digital signal in the second apparatus, from which the derived compressed digital signal is derived, are not received by the first apparatus, concatenating respectively one or more empty packets in the body of the valid signal in the same order of appearance as that adopted in the derived compressed digital signal.

28. The device according to claim 27, wherein the compressed digital signal present in the second apparatus is an original compressed digital signal, said device further comprising:
   a header-data receiver that receives the header data from the original compressed digital signal present in the second apparatus, the received header data comprising at least one pointer marker TLM providing information for calculating the length of the body of the original compressed digital signal; and a forming device that forms the derived compressed digital signal from the received header data and which thus comprises, as header data, the received header data and a signal body of length equal to that of the body of the original compressed digital signal, the body of the derived compressed digital signal representing a space initially filled with the arbitrary data and later containing the at least one data packet received from the second apparatus.

29. The device according to claim 27, wherein the compressed digital signal is partitioned into a number n of independently compressed regions $t_i$, $i=1$ to n and $n \geq 1$, the body of the signal of the derived compressed digital signal comprising, for each region, region header data and a region body containing data packets of the region under consideration.

30. The device according to claim 29, wherein the length of the part of the body of the derived compressed digital signal preceding the data packet under consideration is determined from:
 at least one pointer marker PLT providing information for calculating the length of the data packet or packets preceding the data packet under consideration in the region where this packet is located,
 the length of the header data of the region where the packet under consideration is located, and,
 when one or more regions precede the region where the packet under consideration is located, at least one pointer marker TLM provides information for calculating the length of the preceding region or regions.

31. The device according to claim 29, further comprising:
 a region-header-data receiver that receives region header data;
 a determining device that determines a position at which the received region header data is to be inserted into the body of the derived compressed digital signal, the position being determined according to the length of the header data of the derived compressed digital signal and, when one or more regions of the derived compressed digital signal precede the region header data, also according to one or more pointer markers TLM received previously, said device provides respectively the length of the preceding region or regions; and
 a received-region-header-data inserting device that inserts the received region header data at the determined position.

32. The device according to claim 27, further comprising a length determining device that determines the length of the part of the body of the derived compressed digital signal preceding the at least one data packet and that determines the order of appearance of the at least one data packet in the body of the derived compressed digital signal according to parameters relating to structure and organization of the data in the derived compressed digital signal.

33. The device according to claim 28, further comprising a converter that converts the derived compressed digital signal into a valid signal which comprises:
 an extractor that extracts from the derived compressed digital signal header data and received data packets;
 a forming device that forms the header data of the valid signal from the header data extracted from the derived compressed digital signal; and
 a concatenating device that concatenates the data packets extracted from the derived compressed digital signal in the body of the valid signal and, when one or more data packets present in the body of the original compressed digital signal are not received by the first apparatus, concatenating respectively one or more empty packets in the body of the valid signal in the same order of appearance as that adopted in the derived compressed digital signal.

34. The device according to claim 28, further comprising:
 an examining device that examines the data contained in the body of the derived compressed digital signal;
 a converter that converts, when the examined data does not correspond to a data packet received from the second apparatus, the space filled by the data concerned into an empty packet; and
 a shifting device that shifts in an adapted manner the data comprising the remainder of the body of the derived compressed digital signal.

35. A non-transitory information storage device readable by a computer or a microprocessor comprising code instructions of a computer program for executing the steps of the method of processing a request according to claim 1.

36. A non-transitory information storage device readable by a computer or a microprocessor comprising code instructions of a computer program for executing the steps of the method of processing data according to claim 11.

37. A computer program stored in a non-transitory computer-readable medium for loading into a programmable apparatus, comprising sequences of instructions or portions of software code for implementing the steps of the method of processing a request according to claim 1, when the computer program is loaded and executed by the programmable apparatus.

38. A computer program stored in a non-transitory computer-readable medium for loading into a programmable apparatus, comprising sequences of instructions or portions of software code for implementing the steps of the method of processing data according to claim 11, when the computer program is loaded and executed by the programmable apparatus.

39. The method according to claim 11, further comprising a preliminary step of forming the derived compressed digital signal which thus comprises the header data and the body, the body of the derived compressed digital signal having a length equal to that of the body of the compressed digital signal present in the second apparatus, the body of the derived compressed digital signal representing a space initially filled with the arbitrary data and later containing the at least one data packet of the portion received from the second apparatus.

40. The method according to claim 39, wherein the insertion into the body of the derived compressed digital signal of the at least one data packet leads to overwriting part of the space initially filled with the arbitrary data.

41. The method according to claim 12, wherein the insertion into the body of the derived compressed digital signal of the at least one data packet leads to overwriting part of the space initially filled with the arbitrary data.

42. The device according to claim 27, further comprising a forming device that forms the derived compressed digital signal which thus comprises the header data and the body, the body of the derived compressed digital signal having a length equal to that of the body of the compressed digital signal present in the second apparatus, the body of the derived compressed digital signal representing a space initially filled with the arbitrary data and later containing the at least one data packet of the portion of the compressed digital signal received from the second apparatus.

43. The device according to claim 42, wherein the inserting device overwrites part of the space initially filled with the arbitrary data.

44. The device according to claim 28, wherein the inserting device overwrites part of the space initially filled with the arbitrary data.

45. A method of processing compressed digital data received by a first communication apparatus connected through a communication network to a remote second communication apparatus, the method being implemented in the first communication apparatus, the method comprising the steps of:

receiving only a portion of a compressed digital signal present in the second apparatus and comprising a body that comprises data packets, the received portion of the compressed digital signal comprising at least one data packet;

generating a derived compressed digital signal derived from the compressed digital signal present in the second apparatus in the form of a cache file, the derived compressed digital signal comprising header data and a body and capable of containing all or part of the body of the compressed digital signal present in the second apparatus;

filling the body of the derived compressed digital signal in the cache file with arbitrary data, so as to constitute a space of the same size as the body of the compressed digital signal present in the second apparatus;

determining a position at which the at least one data packet of the received portion of the compressed digital signal is to be inserted into the body of the derived compressed digital signal the position being determined as a function of the length of the header data and of at least one pointer marker previously received and inserted into the header data of the derived compressed digital signal by the first apparatus, the at least one pointer marker providing information for calculating the length of the part of the body of the derived compressed digital signal preceding the at least one data packet of the received portion of the compressed digital signal;

inserting into the body of the derived compressed digital signal the at least one data packet of the received portion of the compressed digital signal at the determined position;

going through the data contained in the body of the derived compressed digital signal;

converting, when the data gone through does not correspond to a data packet received from the second apparatus, the space filled by the data concerned into an empty packet; and shifting in an adapted manner the data comprising the remainder of the body of the derived compressed digital signal.

46. A device for processing compressed digital data received by a first communication apparatus connected through a communication network to a remote second communication apparatus, the device being implemented in the first communication apparatus, the device comprising:

a receiver that receives only a portion of a compressed digital signal present in the second apparatus and comprising a body that comprises data packets, the received portion of the compressed digital signal comprising at least one data packet;

a generating device that generates a derived compressed digital signal derived from the compressed digital signal present in the second apparatus in the form of a cache file, the derived compressed digital signal comprising header data and a body and capable of containing all or part of the body of the compressed digital signal present in the second apparatus;

a filling device that fills the body of the derived compressed digital signal in the cache file with arbitrary data, so as to constitute a space of the same size as the body of the compressed digital signal present in the second apparatus;

a processor that determines a position at which the at least one data packet of the received portion of the compressed digital signal is to be inserted into the body of the derived compressed digital signal, the position being determined as a function of the length of the header data and of at least one pointer marker previously received and inserted into the header data of the derived compressed digital signal by the first apparatus, the at least one pointer marker providing information for calculating the length of the part of the body of the derived compressed digital signal preceding the at least one data packet of the received portion of the compressed digital signal;

an inserting device that inserts, into the body of the derived compressed digital signal, the at least one data packet of the received portion of the compressed digital signal at the determined position;

an examining device that examines the data contained in the body of the derived compressed digital signal;

a converter that converts, when the examined data does not correspond to a data packet received from the second apparatus, the space filled by the data concerned into an empty packet; and a shifting device that shifts in an adapted manner the data comprising the remainder of the body of the derived compressed digital signal.

* * * * *